United States Patent [19]
Mandalakas et al.

[11] Patent Number: 5,977,660
[45] Date of Patent: Nov. 2, 1999

[54] ACTIVE HARMONIC FILTER AND POWER FACTOR CORRECTOR

[75] Inventors: John N. Mandalakas, North Huntingdon; David J. Shero, Library, both of Pa.

[73] Assignee: Mesta Electronics, Inc., Glassport, Pa.

[21] Appl. No.: 08/910,929

[22] Filed: Aug. 8, 1997

Related U.S. Application Data

[60] Provisional application No. 60/024,142, Aug. 9, 1996.
[51] Int. Cl.$^6$ ....................................................... H02J 1/02
[52] U.S. Cl. .......................... 307/105; 333/167; 323/207
[58] Field of Search ........................ 307/105; 363/95–98, 363/88, 39, 40, 41, 44–48; 364/528.21, 528.28, 528.32, 528.33; 323/210, 207, 356; 333/167.12

[56] References Cited

U.S. PATENT DOCUMENTS

| | | | |
|---|---|---|---|
| 4,868,481 | 9/1989 | Owen | 323/253 |
| 5,321,598 | 6/1994 | Moran | 363/41 |
| 5,329,221 | 7/1994 | Schauder | 363/98 |
| 5,351,178 | 9/1994 | Brennen et al. | 363/40 |
| 5,351,181 | 9/1994 | Brennen et al. | 363/71 |
| 5,355,025 | 10/1994 | Moran et al. | 307/105 |
| 5,397,927 | 3/1995 | Suelzle et al. | 307/105 |
| 5,519,600 | 5/1996 | Ahladas | 363/88 |
| 5,552,980 | 9/1996 | Garces et al. | 363/98 |
| 5,567,994 | 10/1996 | Davis et al. | 307/105 |
| 5,619,079 | 4/1997 | Wiggins et al. | 307/105 |
| 5,625,539 | 4/1997 | Nakata et al. | 363/98 |
| 5,780,939 | 7/1998 | Christl et al. | 307/105 |

*Primary Examiner*—Jeffrey Gaffin
*Assistant Examiner*—Jonathan S. Kaplan
*Attorney, Agent, or Firm*—Webb Ziesenheim Logsdon Orkin & Hanson, P.C.

[57] ABSTRACT

An active harmonic filter selectively sources current to or draws current from power lines. The active harmonic filter includes a controller which executes a predictor routine which predicts the current to be supplied to or drawn from the power line at a time $t+\Delta t$ to reduce load induced phase differences between the line voltage and the line current. An integrating slow control routine integrates difference currents between actual line currents and desired line currents in equivalent segments of time in different cycles of the power line. The integrated differences may be combined with proportionally controlled difference currents to reduce or eliminate harmonic line currents. A current balancing routine enables the active harmonic filter to balance currents in two or more lines of a polyphase power line. The predictor, integrating slow control and current balancing routines, may be used singly or in combination to improve the condition of line currents on the power lines.

21 Claims, 13 Drawing Sheets

ACTIVE HARMONIC FILTER AND POWER FACTOR CORRECTOR

CROSS REFERENCE TO RELATED APPLICATION

This application claims the benefit of U.S. Provisional patent application Ser. No. 60/024,142, filed on Aug. 9, 1996.

BACKGROUND OF THE INVENTION

1. Field of the Invention

The present invention relates to power factor correction, harmonic filtering and load balancing of currents drawn from an AC utility power line by a load.

2. Description of the Prior Art

Loads connected to AC utility power lines ideally draw current that is directly in phase with the AC voltage source, is drawn equally on all phases from a polyphase source, and is of the same frequency as the line voltage. Current drawn in this fashion minimizes demand on the power source and on the distribution lines and induces no distortion of the source voltage. Many loads, however, such as motors, motor drives, computers, fluorescent lighting, and the like, do not draw power from the utility power lines in this manner.

Various prior art arrangements have been developed to correct the above-mentioned problems. For example, loads having an inductive displacement power factor can be corrected by installing power factor correction capacitors in parallel with the equipment. If sized correctly, such capacitors will supply reactive current that is directly in phase with the reactive current drawn by the load. Hence, reactive currents will circulate between the capacitors and the load thus requiring no reactive power to be supplied by the source. While effective, capacitors can only be utilized effectively if the load is constant at all times. If the load varies, however, different amounts of capacitance must be connected to the line to avoid having reactive power being drawn from the source when no current is actually needed by the load. Another problem with power factor correction capacitors is the introduction of unwanted resonance in the power lines. Switching systems, such as switching power supplies, which abruptly change their capacitance, are especially susceptible to such resonance in the power lines. Moreover, if a power factor correction capacitor is successfully installed, a different load connected to the line may degrade the performance of the system. Moreover, power factor correction capacitors do very little to correct the problems of harmonic currents and unbalanced loads.

Harmonic currents drawn by many non-linear loads that rectify the AC voltage to produce a DC supply or that phase control the AC voltage may adversely affect the power transmission system. The added current that the power transmission system must supply results in higher transmission losses that can cause large heat losses in transformers of the transmission system. Such losses require over-sized transformers. Moreover, harmonic currents can often distort the AC voltage source which can cause other equipment on the power lines to fail or perform poorly. A trap filter can be utilized to filter such harmonics. However, a separate trap filter is needed for each harmonic. A problem with trap filters, however, is the resonance caused thereby, just as in the case of the power factor correction capacitors. Still another problem is that trap filters will also try to shunt harmonics from loads other than the load to which it is attached. Hence, the trap filter's capacity is exceeded, with corresponding failure of the trap filter.

It is, therefore, an object of the present invention to provide an active harmonic filter which overcomes these problems of the prior art devices. It is an object of the present invention to provide an active harmonic filter that sources current to or draws current from the supply line at appropriate times to reduce or eliminate load induced phase shifts between the line voltage and the line current. It is a further object of the present invention to provide an active harmonic filter that reduces or eliminates line harmonics. It is yet another object of the present invention to provide an active harmonic filter that balances the currents drawn on all phases of a polyphase AC source. Still other objects of the present invention will become apparent to those of ordinary skill in the art upon reading and understanding the following detailed description of the preferred embodiments.

SUMMARY OF THE INVENTION

Accordingly, we have invented an active harmonic filter connectable to a power line that provides electric energy from a source to a load. The active harmonic filter includes a controller and an electric energy storage device which stores electric energy. An inverter is connected between the electric energy storage device and the power line. The inverter controls current flow between the electric energy storage device and the power line in response to a firing command from the controller. A line current detector is positioned to detect current flowing in the power line and to provide an indication of the detected line current to the controller. A filter current detector is positioned to detect filter current flowing between the electric energy storage device and the power line and to provide an indication of the detected filter current to the controller. The line current and the filter current are combined to form a load current supplied to the load. A conductor is connected to the power line for enabling the controller to detect the voltage on the power line. The controller includes one or more of (i) a predictor which predicts in advance from samples of line current, filter current, and line voltage a first adjustment to be combined with the firing command to cause the inverter to at least one of supply filter current to and draw filter current from the power line; (ii) an integrating slow control which integrates differences between actual line current and desired line current in equivalent times in difficult cycles of the line voltage and which generates therefrom a second adjustment that is combinable with the firing command; (iii) a proportional controller which generates from differences between actual line current and desired line current a third adjustment that is combinable with the firing command; and (iv) a current balancer which balances currents in two or more lines of the power line as a function of samples of the line current and line voltage.

We have also invented a method of reducing on an AC power line at least one of phase shift between line voltage and load current, and a harmonic of the load current. The method includes sampling load current and the line voltage at a plurality of sample times during a first cycle of the power line. For each sample of load current and line voltage, a desired load current that is in phase with the line voltage is determined. For each of the plurality of sample times, a first difference current between the desired load current and the sampled load current is determined. From closely adjacent pairs of first difference currents, a plurality of second difference currents are determined. Each second difference current corresponds to the difference between one closely adjacent pair of first difference currents. Each second difference current is combined with the actual line current at a time during a second cycle of the power line having a select temporal relation to each pair of first difference currents in the first cycle of the power line corresponding to each said second difference current.

The method may also include the steps of sampling load current and line voltage at a plurality of sample times during the second cycle of the power line equivalent to the plurality of sample times during the first cycle of the power line. At a sample time during the second cycle of the power line, a stored second difference current is retrieved. The retrieved second difference current is determined at a time intermediate the sample time during the second cycle of the power line and equivalent sample time during the first cycle of the power line. The retrieved second difference current is combined with the load current at a time during the second cycle of the power line equivalent to the intermediate sample time.

DESCRIPTION OF THE PREFERRED EMBODIMENTS

Figure 1:
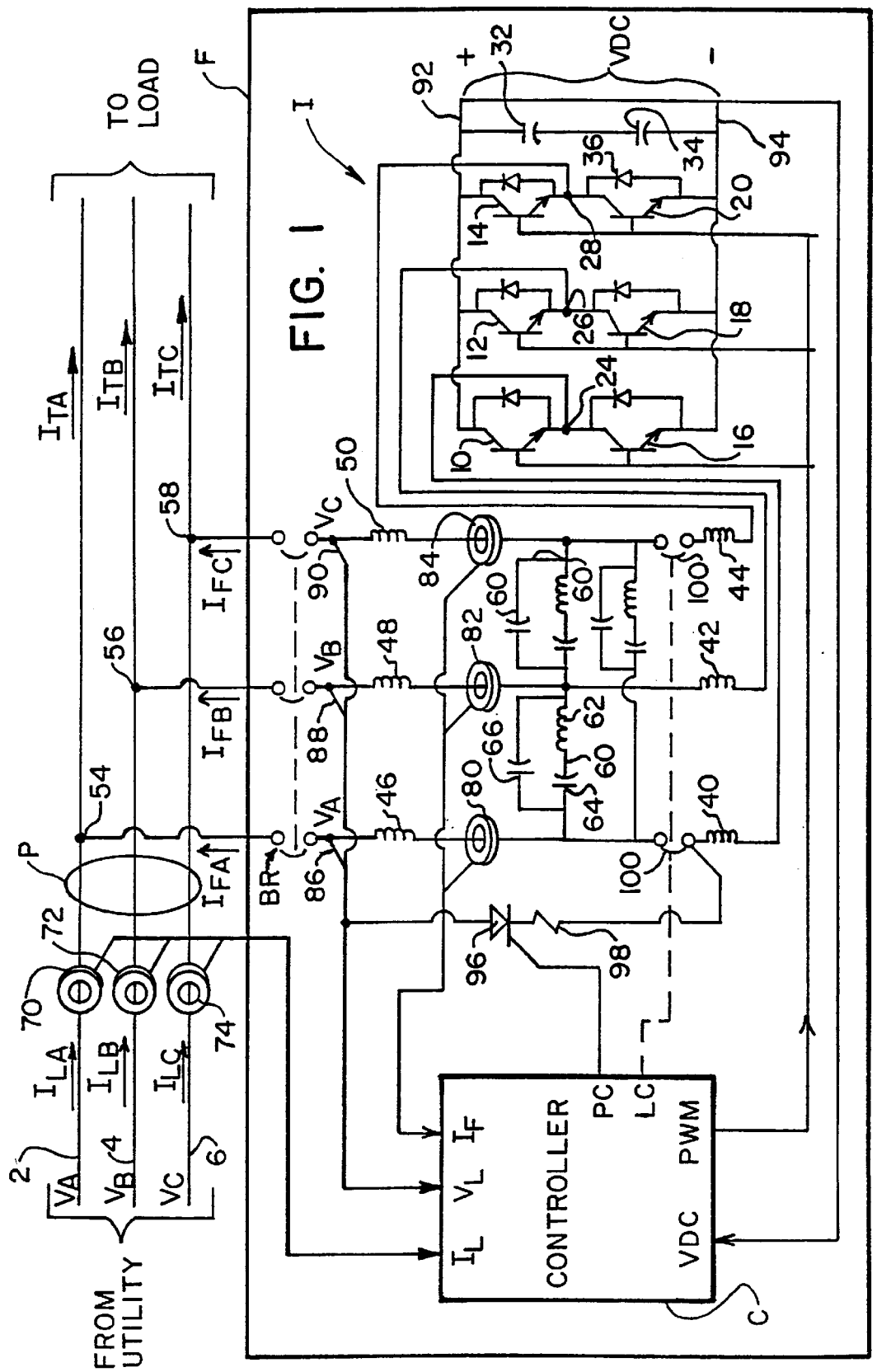
FIG. 1 shows a circuit diagram of an active harmonic filter in accordance with one embodiment of the present invention connected to a 3-phase power line.

With reference to FIG. 1, an active harmonic filter F is connected to a power line P utilized to convey AC power from a 3-phase source to a load. The power line P includes three lines 2, 4 and 6 that are utilized to convey the voltages $V_{AB}$, $V_{BC}$ and $V_{CA}$ and the line currents $I_{LA}$, $I_{LB}$, and $I_{LC}$ of phases A, B and C, respectively, of the source to the load. The source of AC power may be Delta or Y connected. If Y connected, a neutral (shown in FIG. 9) may also be provided between the source and the load.

The active harmonic filter F includes a controller C that controls an inverter I to selectively source current to or draw current from the lines 2, 4 and 6 to reduce load induced phase differences between the voltages $V_{AB}$, $V_{BC}$ and $V_{CA}$ and the currents $I_{LA}$, $I_{LB}$, and $I_{LC}$, respectively, reduce line current harmonics and balance the currents in lines 2, 4 and 6.

The inverter I includes a plurality of transistors 10–20, such as IGBTs, that are utilized to selectively source current to or draw current from the lines 2, 4 and 6. The emitter terminals of transistors 10, 12 and 14 are connected to the collector terminals of transistors 16, 18 and 20 and form nodes 24, 26 and 28, respectively. A pair of series connected capacitors 32–34 are connected in parallel with the series connected transistors 10–16, 12–18 and 14–20. Connected between the emitter terminal and the collector terminal of each transistor 10–20 is a diode 36. Each diode 36 has its anode connected to the emitter terminal and its cathode connected to the collector terminal of corresponding transistors 10–20.

Connected between nodes 24, 26 and 28 and the lines 2, 4 and 6 are power inductors 40, 42 and 44 and high frequency block inductors 46, 48 and 50, respectively. The junction of the high frequency block inductors 46, 48 and 50 and lines 2, 4 and 6 form nodes 54, 56 and 58, respectively. Connected between lines 2–4, 4–6 and 6–2 are high frequency traps/bypasses 60. Each high frequency trap/bypass 60 includes an inductor 62 and a capacitor 64 connected in series and having a resonant frequency, preferably, at or near a switching frequency of the inverter I. A capacitor 66 is connected in parallel with the series connected inductor 62 and capacitor 64. The capacitor 66 is utilized to pass between lines 2, 4 and 6 frequencies above the resonant frequency of the series connected inductor 62 and capacitor 64.

Line current sensors 70, 72 and 74 are positioned to detect the line currents $I_{LA}$, $I_{LB}$ and $I_{LC}$ in lines 2, 4 and 6, respectively, and to provide outputs corresponding thereto to the controller C. Preferably, the line current sensors 70, 72 and 74 are Hall-effect type sensors or current transformers. Filter current sensors 80, 82 and 84 are positioned to detect the filter currents $I_{FA}$, $I_{FB}$ and $I_{FC}$ flowing in the power inductors 40, 42 and 44, respectively, and to provide outputs corresponding thereto to the controller C. Preferably, the filter current sensors 80, 82 and 84 are Hall-effect type sensors.

Conductors 86, 88 and 90 are connected between the controller C and lines 2, 4 and 6, respectively, to enable the controller C to selectively detect the voltages $V_{AB}$ and $V_{BC}$ across lines 2–4 and 4–6. Conductors 92 and 94 are connected across the capacitors 32–34 and to the controller C to enable a voltage VDC impressed on the capacitors 32–34 to be detected by the controller C. The transistors 10–20 have base terminals that are connected to the controller C which supplies pulse-width-modulated (PWM) signals thereto.

The controller C includes a pre-charge PC output that is connected to a gate terminal of an SCR 96 or other suitable half-phase switching device. Connected in series with the SCR 96 is a resistor 98. The SCR 96 has its anode terminal connected to one of the lines, e.g., line 2. The side of the resistor 98 opposite SCR 96 is connected to the side of power inductor 40 opposite node 24. The controller C has a line contactor output LC that is utilized to control the operation of a line contactor 100 that controllably isolates the inductors 40 and 44 from lines 2 and 6, respectively, during pre-charging of the capacitors 32–34. A breaker BR is utilized to connect the inductors 46, 48 and 50 to the lines 2, 4 and 6.

To pre-charge the capacitors 32–34, the line contactor 100 is opened and breaker BR is closed. The controller provides firing signals on its PC output that cause the SCR 96 to turn-on for progressively longer half-phase intervals. For each on-time of the SCR 96, line 2 is connected to the side of inductor 40 opposite node 24 thereby enabling current to flow from line 2 through SCR 96 and resistor 98 and through inductor 40 to node 24. From node 24, the current flows through diode 36 of transistor 10, through capacitors 32–34 and through diode 36 of transistor 18 to node 26. From node 26 the current flows through inductors 42 and 48 to line 4. The inductors 40 and 42 and resistor 98 avoid excessive inrush current when the capacitors 32–34 are first connected between lines 2 and 4. When the capacitors 32–34 are charged to a sufficient level, the controller C terminates the firing signals and outputs on the line contactor output LC a signal that causes line contactor 100 to close and connect inductors 40 and 44 to lines 2 and 6, respectively. The controller C provides modulated PWM signals that enable transistors 10–20 and power inductors 40, 42 and 44 to co-act and charge capacitors 32–34 to a voltage VDC, preferably, about 15% above the peak voltage appearing across lines 2–4, 4–6 and 6–2. For example, for a 480 VAC voltage measured across lines 2–4, the capacitors 32–34 are charged to approximately 780 volts.

Figure 2:
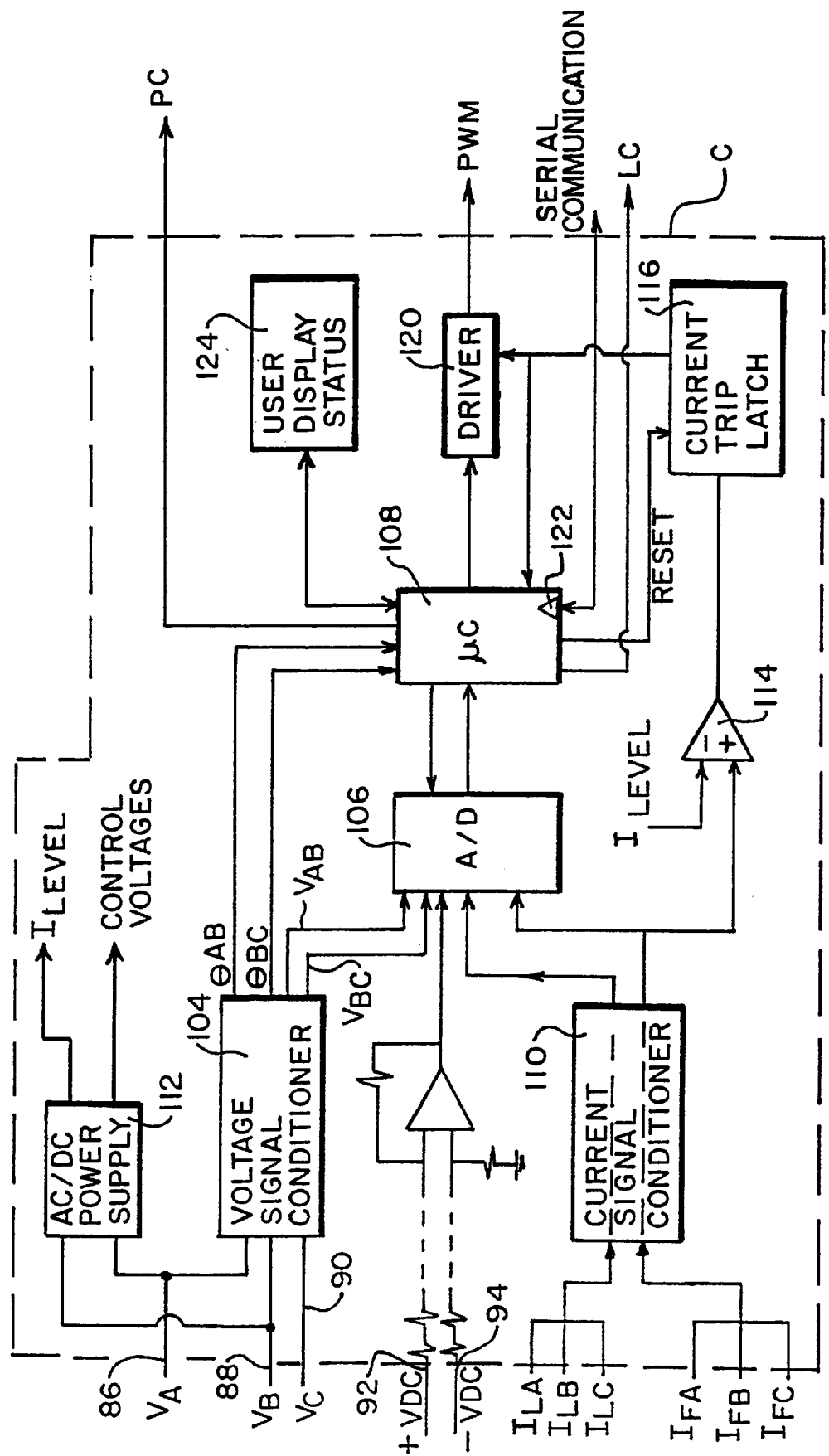
FIG. 2 shows a block diagram of the internal components of the controller C of the active harmonic filter of FIG. 1.

With reference to FIG. 2 and with continuing reference to FIG. 1, the controller C includes a voltage signal conditioner 104 which is connected to lines 2, 4 and 6 via the conductors 86, 88 and 90. The voltage signal conditioner 104 conditions and provides to an A/D converter 106 voltages $V_{AB}$ and $V_{BC}$ and provides to a microcontroller 108 phases $\Theta_{AB}$ and $\theta_{BC}$. The microcontroller 108 includes support circuitry (not shown), such as a memory unit that includes RAM and ROM, I/O drivers, timers and the like. The voltages $V_{AB}$ and $V_{BC}$ are converted by the A/D converter 106 to corresponding digital values which are provided to the microcontroller 108. The microcontroller 108 provides synchronization and control signals to the A/D converter 106 to control the operation thereof. A current signal conditioner 110 receives the output of line current sensors 70, 72 and 74 and filter current sensors 80, 82 and 84. The signal conditioner 110 conditions the received signals and provides conditioned signals indicative of the line currents $I_{LA}$, $I_{LB}$ and $I_{LC}$ and the filter currents $I_{FA}$, $I_{FB}$ and $I_{FC}$ to the A/D convertor 106 which converts the conditioned signals into digital values which are provided to the microcontroller 108.

An AC/DC power supply 112 is connected across two of the lines, e.g., 2–4 and, converts AC power therefrom into DC control voltages utilized by internal circuitry of the controller C. The power supply 112 also provides a reference voltage signal $I_{LEVEL}$ to an inverting input of a comparator 114 that has its non-inverting input connected to detect a conditioned signal corresponding to the output of one of the filter currents sensors 80, 82 and 84. The output of the comparator 114 is provided to a current trip latch 116. When a current detected by one or more of filter current sensor 80, 82 and 84 produces a voltage that exceeds the reference voltage signal $I_{LEVEL}$, the output of the comparator 114 changes in state. In response to this change in state, the current trip latch 116 provides a signal to the microcontroller 108 and driver 120 which causes the PWM signals provided to the transistors 10–20 to be terminated. The termination of PWM signals to the transistors 10–20 causes the filter F to terminate sourcing current to or drawing current from lines 2, 4 and 6.

A line driver 120 is connected to receive from the microcontroller 108 data corresponding to desired duty cycle 5 of the PWM signals provided to the transistors 10–20. The driver 120 converts the supplied data into the desired PWM signals, having the desired duty cycles, provided to the base terminals of transistors 10–20. The microcontroller 108 causes the transistors 10–20 to be modulated at a frequency of approximately 10 KHz which, for a supply line frequency of 60 Hz, results in 168 PWM periods per cycle of the lines 2, 4 and 6.

The microcontroller 108 has a bi-directional serial communications port 122 for bi-directional communication with devices external to the controller C, such as a remote computer. A user display status 124 is provided to indicate the operational status of the filter F.

Figure 3:
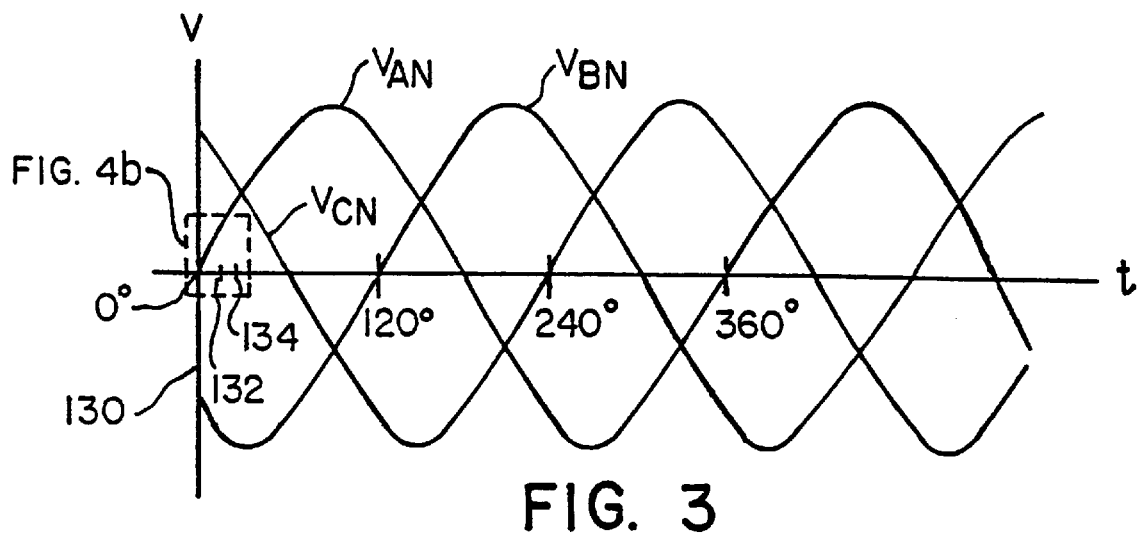
FIG. 3 shows a voltage waveform of the voltages appearing on the 3-phase power lines of FIG. 1 referenced to a neutral.

With reference to FIG. 3, the 3-phase source produces across the lines 2–4, 4–6 and 6–2, the voltages $V_{AB}$, $V_{BC}$ and $V_{AC}$ that are electrically shifted in phase with respect to each other by 120 electrical degrees in a manner known in the art. In conventional 3-phase power systems, the amplitude and phase of phase-to-phase voltages $V_{AB}$, $V_{BC}$ and $V_{CA}$ can be numerically converted to phase-to-neutral voltages $V_{AN}$, $V_{BN}$ and $V_{CN}$, as shown in FIG. 3.

The 3-phase source ideally supplies voltages and currents to a purely resistive load, i.e., a load with no reactive components, to introduce phase shifts between the line voltage and the line current. To correct for phase differences between line voltages and line currents, harmonic currents or phase current imbalance, the active harmonic filter F sources current to or draws current from the lines 2, 4 and 6 at a plurality of suitable times during each cycle of the line voltage.

Figure 4A:
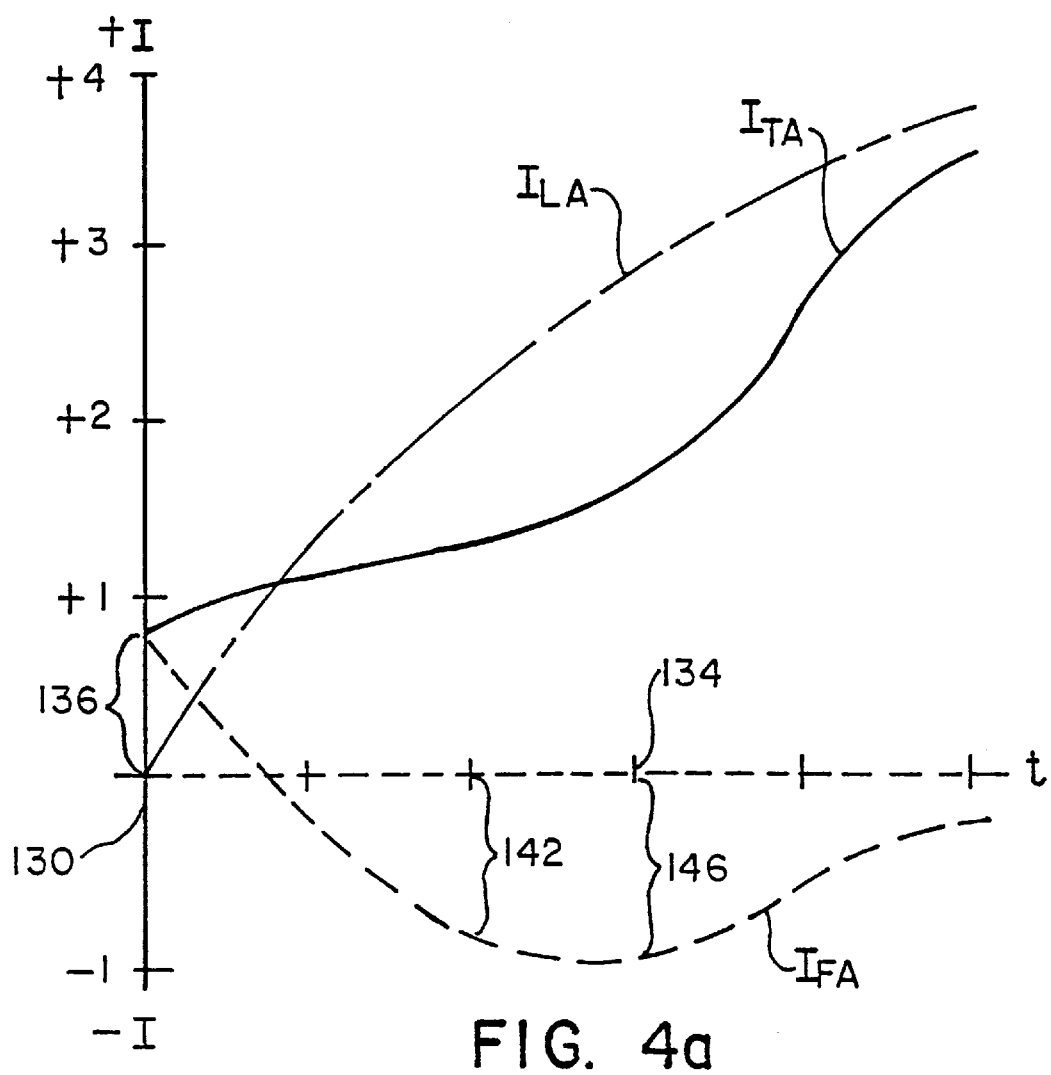
FIGS. 4a–4b show current and voltage waveforms of a portion of the voltage waveform in FIG. 3 including current and voltage waveforms produced by the filter F in FIG. 1.
Figure 4B:
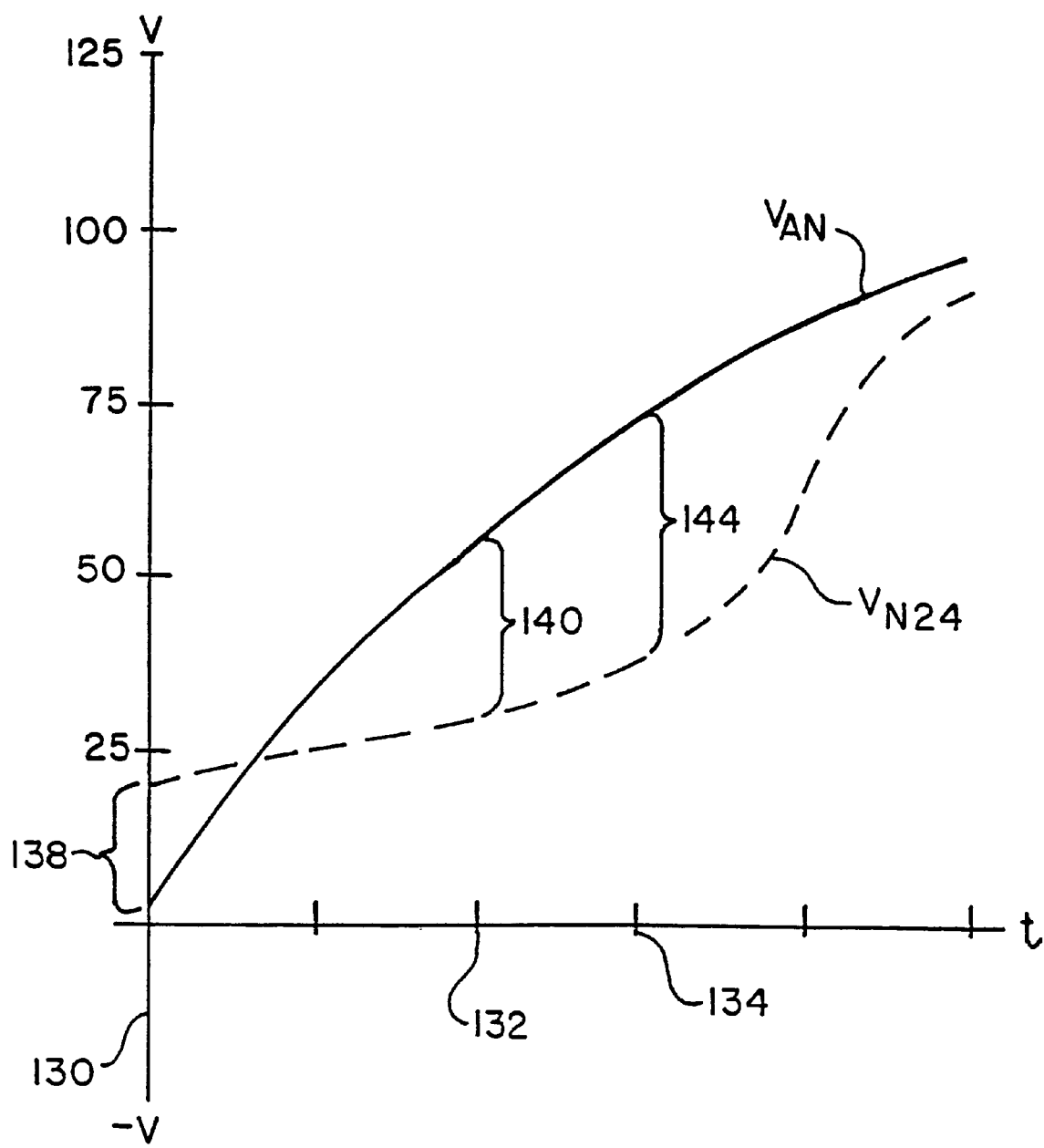

With reference to FIGS. 4a and 4b and with continuing reference to FIG. 1, when the filter F is not sourcing or drawing current, the microcontroller 108 adjusts the duty cycle of the PWM signals provided to transistors 10–20 during each PWM period so that the voltages at nodes 24, 26 and 28 track the line voltages at nodes 54, 56 and 58, respectively. For example, as the voltage $V_{AN}$ increases between a time 130 and a time 134, the duty cycle of the PWM signals supplied to the base terminal of transistors 10, 18 and 20 are increased and the duty cycle of the PWM signals supplied to the base terminals of transistors 16, 12 and 14 are decreased. Importantly, the duty cycle of any pair of series connected transistors, e.g., 10 and 16, are selected so that both of the series transistors are not on simultaneously.

When the filter F sources or draws current, the PWM signals provided to the transistors 10–20 are selectively modulated. For example, to source current 136 to line 2 at time 130, the duty cycle of the PWM signals provided to the base terminals of transistors 12, 14 and 16 are decreased and the duty cycle of the PWM signals provided to the base terminals of transistors 10, 18 and 20 are increased. These PWM signals alternately connect node 24 to the +VDC side and –VDC side of capacitors 32–34 and connect nodes 26 and 28 to the –VDC side and +VDC side of capacitors 32–34, respectively. More specifically, when transistors 12, 14 and 16 are on, a circuit path is created between nodes 54 and 24, through transistor 16 to the –VDC side of capacitors 32–34, through transistors 12 and 14 to nodes 26 and 28 and to nodes 56 and 58. Similarly, when transistors 10, 18 and 20 are on, a circuit path is created between nodes 24 and 54, through transistor 10 to the +VDC side of capacitors 32–34, through transistors 18 and 20 to nodes 26 and 28 and to nodes 56 and 58. The duty cycle of the PWM signals to transistors 10–20 are selected so that the voltage drop between nodes 24 and 54 results in the current 136, e.g., 0.8 amps, being supplied to the line 2 at time 130.

The microcontroller 108 determines the voltage drop $V_L$ across inductors 40 and 46 and the impedance of the inverter necessary to draw the current 136 from the conductor 2 at time 130 utilizing the formula:

$$VL=(I_{FA})(R)+(L)(dI_{FA}/dt)$$

where $I_{FA}$=the current through inductors 40 and 46;
R=resistance of inductors 40 and 46 and of the inverter; and L=inductance of inductors 40 and 46.

To determine the voltage 138 required at node 24 at time 130 to cause current 136 to flow through inductors 40, 46, the microcontroller 108 samples the voltages $V_{AB}$, $V_{BC}$ and phases $\Theta_{AB}$, $\Theta_{BC}$; determines an equivalent phase-to-neutral voltage $V_{AN}$; and adds the phase-to-neutral voltage $V_{AN}$ and the voltage $V_L$.

The microcontroller 108 calculates the appropriate duty cycle of the PWM signals provided to transistors 10–20 to produce at node 24 the voltage 138 that draws the current 136 from line 2. Similarly, at time 132 the microcontroller 108 causes a voltage 140 to be produced at node 24 that causes a current 142 to be drawn from line 2. Likewise, at time 134 the microcontroller 108 causes a voltage 144 to be produced at node 24 that causes a current 146 to be drawn from line 2.

The microcontroller 108 includes a software routine resident in a memory unit. The software routine causes the microcontroller 108 to sample at a plurality of times during each line cycle the line-to-line voltages $V_{AB}$ and $V_{BC}$, the line currents $I_{LA}$, $I_{LB}$, and $I_{LC}$, the voltage VDC across capacitors 32–34, and filter currents $I_{FA}$, $I_{FB}$ and $I_{FC}$. The software routine includes a control algorithm that determines the data to be supplied to the driver 120 that causes the duty cycle of the PWM signals provided to transistors 10–20 to be modulated at appropriate times to cause the desired filter currents $I_{FA}$, $I_{FB}$ and $I_{FC}$ to be supplied to or drawn from lines 2, 4 and 6.

With reference to FIGS. 5a–5d and with continuing reference to FIGS. 1 and 2, the control algorithm generates variables for each calculation of data provided to the driver 120. The control algorithm will be described in respect of the calculation of data for correction of phase shift and line harmonics for the A phase, i.e., line 2, of the 3-phase source. However, similar calculations are performed to correct for phase shifts and line harmonics in the B phase, i.e., line 4 of the 3-phase source. For purposes of describing the control algorithm, the following listing of variables and a brief description of each variable is provided:

| | |
|---|---|
| $K1_A$ | value corresponding to magnitude of RMS line current to be drawn from phase A to satisfy the load requirement |
| K2 | value corresponding to RMS line current to maintain VDC at desired level |
| $K3_A$ | RMS line current $I_{LA}$ to satisfy load requirement and to maintain VDC at desired level |
| K4 | empirically determined value that is directly proportional to the period of utility voltage and inversely proportional to VDC, to correct for variations in these two parameters |
| $K5_A$, $K5_B$, $K5_C$ | values corresponding to PWM modulation that causes the voltage output by the filter F to track the line voltage |
| $K6_A$ | value corresponding to instantaneous desired line current $1_{LA}$ to provide all power to load |
| $K7_A$ | value corresponding to difference current between instantaneous actual line current $I_{LA}{}^{INST}$ and instantaneous desired line current $K6_A$ |
| $K8_A$ | value corresponding to voltage needed to reduce line harmonics and balance line currents $I_{LA}$, $I_{LB}$ and $I_{LC}$ |
| $K9_A$ | value corresponding to instantaneous actual load current $I_{TA}$ |
| $K10_A$ | value corresponding to instantaneous filter current $I_{FA}$ to be supplied to line current $I_{LA}$ to achieve the instantaneous desired line current $I_{LA}$, i.e., $K6_A$ |
| $K11_A$ | value corresponding to filter current $I_{FA}$ combined at time t with value $K10_A$ to obtain an adjustment value $A_P$ corresponding to current $I_{FA}$ to be supplied at time $t + \Delta t$ |
| $K12_A$ | value corresponding to voltage needed to reduce line harmonics and balance line currents $I_{LA}$, $I_{LB}$ and $I_{LC}$ |
| $K13_A$ | value corresponding to voltage needed at tiine $t + \Delta t$ to produce filter current $I_{FA}$ that reduces the phase difference between the load current $I_{LA}$ and the line voltage $V_{AN}$, reduces line harmonics and balances line currents |
| $K14_A$, $K14_B$ $K14_C$ | values corresponding to value $K13_A$ limited to avoid software current limit $I_{LIMIT}$, e.g., 250% of rated RMS maximum filter current |
| $I_{FA}$ | |
| $K15_A$, $K15_B$ $K15_C$ | values corresponding to difference between $K13_A$ and $I_F{}^{LIMIT}$ |
| $K16_A$, $K16_B$ $K16_C$ | value of modulation needed to reduce phase shifts between line voltages $V_{AN}$, $V_{BN}$ and $V_{CN}$ and line currents $I_{LA}$, $I_{LB}$ and $I_{LC}$ and line voltage harmonics and to improve the balance of the load currents $I_{LA}$, $I_{LB}$ and $I_{LC}$ |
| $K17_A$, $K17_B$ $K17_C$ | values corrseponding to modulation to be applied to the leading and falling edges of PWM waveforms |
| $V_1$, $V_2$, $V_3$ | data values of $K17_A$, $K17_B$ and $K17_C$ normalized, clamped and scaled |

Similarly, values $K1_B$, $K3_B$, $K7_B$, $K8_B$, $K9_B$, $K10_B$, $K11_B$, $K12_B$, $K13_B$ exists for phase B.

The control algorithm causes the microcontroller 108 to measure at a plurality of times during each line cycle the instantaneous line-to-line voltages $V_{AB}{}^{INST}$ and $V_{BC}{}^{INST}$. The value $V_{CA}{}^{INST}$ for each of the plurality of times is determined from the samples of $V_{AB}{}^{INST}$ and $V_{BC}{}^{INST}$. The microcontroller 108 also measures the instantaneous line currents $I_{LA}{}^{INST}$, $I_{LB}{}^{INST}$ and $I_{LC}{}^{INST}$ and the instantaneous filter currents $I_{FA}{}^{INST}$, $I_{FB}{}^{INST}$ and $I_{FC}{}^{INST}$. From the plurality of measured instantaneous line and filter currents, corresponding instantaneous load currents $I_{TA}{}^{INST}$, $I_{TB}{}^{INST}$ and $I_{TC}{}^{INST}$ are determined. RMS line-to-neutral voltages $V_{AN}{}^{RMS}$, $V_{BN}{}^{RMS}$ and $V_{CN}{}^{RMS}$ and RMS line currents $I_{LA}{}^{RMS}$, $I_{LB}{}^{RMS}$ and $I_{LC}{}^{RMS}$ can be calculated for a desired interval, e.g., one line cycle, from the instantaneous line-to-neutral voltages, line currents and filter currents.

Figure 5A:
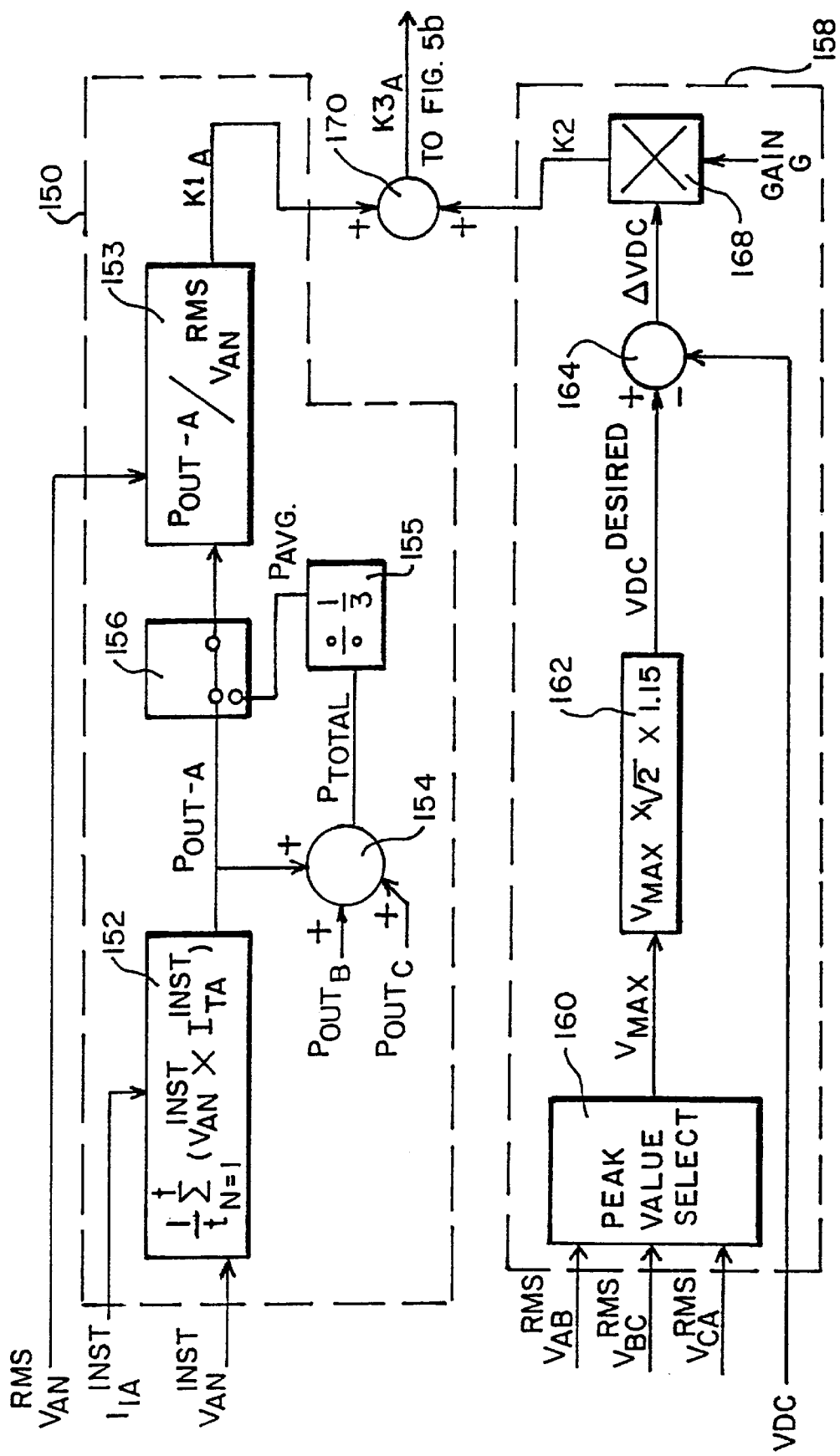
FIGS. 5a–5d show a software flow diagram of a control routine implemented by the controller C in FIG. 1.

With reference to FIG. 5a, the control algorithm includes a routine 150 which includes a step 152 where the power supplied to the load over an interval of time t is determined from the plural samples of the instantaneous line voltage $V_{AN}{}^{INST}$ and corresponding instantaneous line current $I_{TA}{}^{INST}$. Step 152 produces a value $P_{OUT-A}$ corresponding to the power delivered to the load from the calculated phase-to-neutral circuit, e.g., $V_{AN}$, during a time t. In a step 153, the value $P_{OUT-A}$ is divided by the calculated value of the RMS line-to-neutral voltage $V_{AN}{}^{RMS}$ to obtain the value $K1_A$ corresponding to the magnitude of the RMS line current $I_L{}^{ARMS}$ to satisfy the requirement of the load. If it is desired to balance the currents in the lines 2, 4 and 6, a step 154 combines the values $P_{OUT-A}$, $P_{OUT-B}$ and $P_{OUT-C}$ and outputs a value $P_{TOTAL}$ corresponding to the total power delivered to the load from the calculated phase-to-neutral circuits $V_{AN}$, $V_{BN}$ and $V_{CN}$. The values $P_{OUT-B}$ and $P_{OUT-C}$ are determined in a manner similar to $P_{OUT-A}$. In step 155, the value $P_{TOTAL}$ is divided by 3 to produce an average power value $P_{AVG}$. The average power value $P_{AVG}$ is provided to a software switch 156 which selectively directs the value of $P_{OUT-A}$ or $P_{AVG}$ to step 153 for the calculation of the value $K1_A$. The value $P_{AVG}$ is also utilized to determine values of $K1_B$ for the B phase.

The control algorithm includes a routine 158 which includes a step 160 where the peak value of the RMS line-to-line voltages $V_{AB}{}^{RMS}$, $V_{BC}{}^{RMS}$ and $V_{CA}{}^{RMS}$ is detected and provided as an output $V_{MAX}$ to step 162. Step 162 calculates the value $VDC^{DESIRED}$ corresponding to the desired VDC voltage across capacitors 32–34 that is a selected amount, e.g., 15%, in excess of the peak voltage detected in step 160. In step 164, the value of $VDC^{DESIRED}$ and the measured value VDC are combined to obtain a difference value $\Delta VDC$. In step 168, the difference value of $\Delta VDC$ is combined with a proportional control gain function G to obtain the value K2 which corresponds to the RMS current needed to maintain VDC at the desired level. In step 170, the values $K1_A$ and K2 are combined to produce a value $K3_A$ corresponding to the line current $I_{LA}$ needed to satisfy the phase A load requirement and to maintain VDC at the desired level. Steps corresponding to steps 160–170 are performed to obtain values for $K3_B$ for the B phase.

Figure 5B:
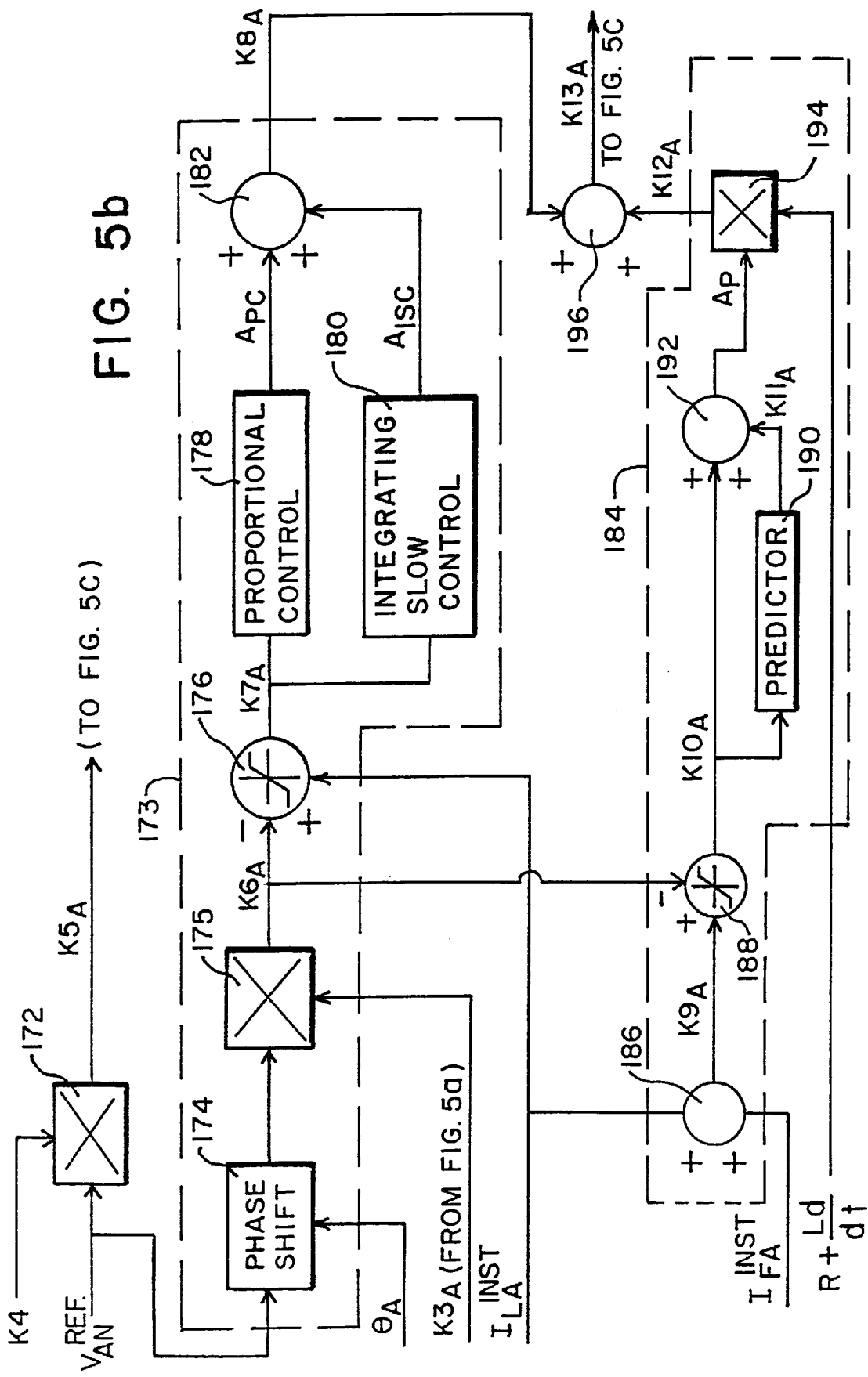

Referring to FIG. 5b, the microcontroller 108 determines a line-to-neutral reference voltage $V_{AN}{}^{REF}$ from the calculated value of RMS line-to-neutral voltage $V_{AN}{}^{RMS}$ and the calculated phase $\Theta_{AN}$. The line-to-neutral reference voltage $V_{AN}{}^{REF}$ is a calculated sine wave that is directly in phase with $V_{AN}{}^{RMS}$. In step 172, the line-to-neutral reference voltage $V_{AN}{}^{REF}$ is combined with a value K4 which is directly proportional to the period of the utility voltage and inversely proportional to the voltage VDC across capacitors 32–34. More specifically, the value K4 is calculated as follows:

$$K4 = \frac{(\text{Period of AC source})(VDC\_Nominal)}{(VDC)(\text{Period\_Nominal})}$$

Step 172 outputs a value $K5_A$ which corresponds to a phase A PWM modulation that is combined with a nominal phase A PWM modulation to produce at node 24 a voltage that tracks the voltage on line 2.

The line-to-neutral reference voltage $V_{AN}{}^{REF}$ is also provided to a routine 173 which includes a step 174 where the line-to-neutral reference voltage $V_{AN}{}^{REF}$ is combined with a software generated phase $\Theta_A$. The phase $\Theta_A$ is normally zero degrees. However, as the filter F approaches its maximum current capability, the value of phase $\Theta_A$ can be increased up to the calculated phase shift between the line-to-neutral voltage $V_{AN}$ and the load current $I_{TA}$. As will be discussed in greater detail hereinafter, this results in the filter F utilizing its full capacity to reduce harmonics at the expense of less correction of phase differences between line-to-neutral voltages and line currents.

The value of $K3_A$ from step 170 is provided to step 175 of routine 173. Step 175 combines the value $K3_A$ with the output of step 174 to obtain a value $K6_A$ corresponding to the instantaneous desired line current $I_{LA}$ required to provide all of the power to the load. In step 176, the value $K6_A$ is combined with the instantaneous line current $I_{LA}{}^{INST}$ and the combination is limited to produce a value $K7_A$ corresponding to the difference current between the instantaneous line current $I_{LA}{}^{INST}$ and $K6_A$. The value $K7_A$ is provided to a proportional control routine 178 and an integrating slow control routine 180.

The proportional control routine 178 combines the value $K7_A$ with a known proportional control algorithm to produce an adjustment value $A_{PC}$. The integrating slow control 180, to be described in greater detail hereinafter, produces an adjustment value $A_{ISC}$ in response to the input of the value $K7_A$ thereto. In step 182, the values of $A_{PC}$ and $A_{ISC}$ are combined to produce the value $K8_A$ which is utilized to reduce harmonics of the line current, correct phase shifts and balance the line currents.

A control routine 184 is utilized to determine the filter current $I_{FA}$ to be supplied to or drawn from the line current $I_{LA}$ at a time $t+\Delta t$. The control routine 184 includes a step 186 where the instantaneous line current $I_{LA}{}^{INST}$ is combined with the instantaneous filter current $I_{FA}{}^{INST}$ to obtain a value $K9_A$ corresponding to the instantaneous load current $I_{TA}{}^{INST}$. In step 188, the values $K9_A$ and $K6_A$ are combined to produce a difference value $K10_A$ corresponding to the instantaneous filter current $I_{FA}$ to be sourced to or drawn from the line current $I_{LA}$ to reduce harmonics, phase shift, and current imbalance. Ideally, the PWM signal modulation that causes the filter currents $I_{FA}$, $I_{FB}$ and $I_{FC}$ to be sourced to or drawn from the lines 2, 4 and 6, are calculated and provided in real time. However, the approximately 10 KHZ switching frequency of the inverter and, the digitization of data and the foregoing calculations introduce delays that prevent real-time calculation and application of the PWM signal modulation. Hence, by the time corrections to the modulation of the PWM signals are made, it is often too late to totally correct the line currents $I_{LA}$, $I_{LB}$ and $I_{LC}$. Accordingly, it is necessary to predict how the line currents $I_{LA}$, $I_{LB}$ and $I_{LC}$ are going to react at a time $t+\Delta t$.

The control routine 184 includes a predictor routine 190, to be described in greater detail hereinafter, which produces a value $K11_A$ corresponding to the filter current to be supplied at time $t+\Delta t$. In step 192, the values $K10_A$ and $K11_A$ are combined to produce an adjustment value $A_P$ corresponding to the filter current $I_{FA}$ needed at time $t+\Delta t$. In step 194, the adjustment value $A_P$ is combined with the resistive and inductive values of the inductors, e.g., 40 and 46, and the inverter through which the filter current $I_{FA}$ flows at time $t+\Delta t$. Step 194 produces a value $K12_A$ corresponding to the voltage to be produced at node 24 to cause the filter current $I_{FA}$ to be supplied at time $t+\Delta t$. More specifically, the value $K12_A$ accounts for the voltage drop across inductors 40 and 46 and the inverter switches caused by filter current $I_{FA}$ flowing therethrough. In step 196, the values of $K8_A$ and $K12_A$ are combined to produce a value $K13_A$ corresponding to the voltage needed to provide the filter current $I_{FA}$ at time $t+\Delta t$ that reduces the phase difference between the voltage on line 2 and the line current $I_{LA}$ and reduces harmonics of the current on line 2.

Figure 5C:
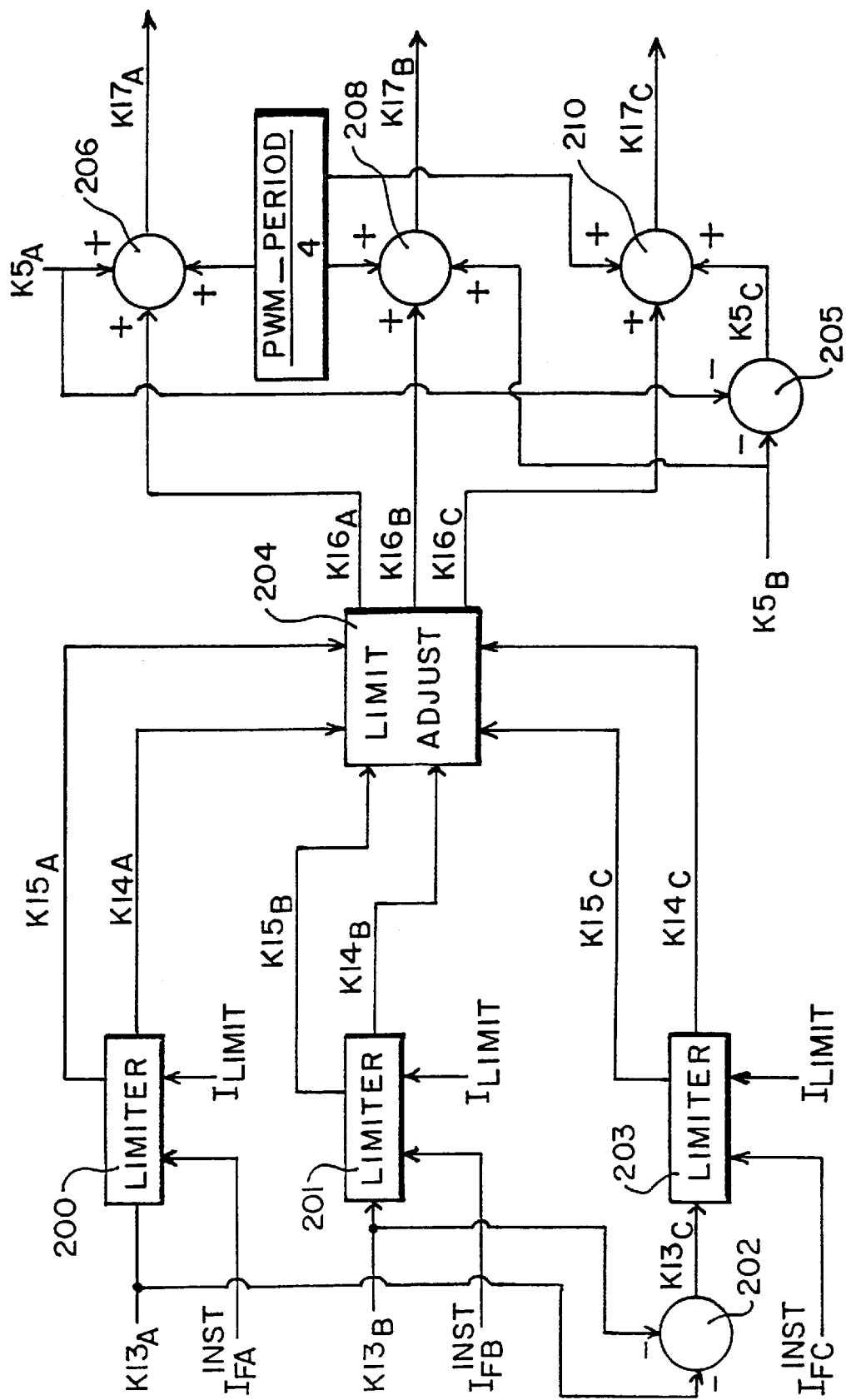

With reference to FIG. 5c, in steps 200 and 201, a current limit $I_{LIMIT}$ is combined with the instantaneous filter currents $I_{FA}{}^{INST}$ and $I_{FB}{}^{INST}$ and values $K13_A$ and $K13_B$, respectively. The value $K13_B$ is determined in a manner similar to the value $K13_A$. In a step 202, the values of $K13_A$ and $K13_B$ are combined to produce a value $K13_C$. In step 203, the software generated current limit $I_{LIMIT}$, the instantaneous filter current $I_{FC}{}^{INST}$ and the value $K13_C$ from step 202 are combined. The steps 200, 201 and 203 output values $K14_A$, $K14_B$ and $K14_C$ corresponding to the values of $K13_A$, $K13_B$ and $K13_C$, respectively, limited to avoid the filter limit current value $I_{LIMIT}$, which is preferably 250% of the rated RMS current of the filter F. Steps 200, 201 and 203 also generate values $K15_A$, $K15_B$ and $K15_C$ corresponding to the difference between $K13_A$ and $I_{LIMIT}$, $K13_B$ and $I_{LIMIT}$ and $K13_C$ and $I_{LIMIT}$, respectively.

In step 204, the modulation difference values $K15_A$, $K15_B$ and $K15_C$ are summed. If the sum of the difference values does not equal zero, modulation values $K14_A$, $K14_B$ and K14$_C$ are adjusted so that the difference values K15$_A$, K15$_B$ and K15$_C$ sum to zero. More specifically, when the difference values K15$_A$, K15$_B$ and K15$_C$ do not sum to zero, adjustments are made to two of the modulation values, e.g., K14$_A$ and K14$_B$, requiring the least adjustment. This adjustment includes subtracting half of the sum of the difference values from each of the two phases. The limit adjust step 204 outputs values K16$_A$, K16$_B$ and K16$_C$ corresponding to the modulation adjustment needed to reduce the phase shift between the line voltage and line current, to reduce line current harmonics and to improve the balance of load currents in the lines 2, 4 and 6 if P$_{AVG}$ is utilized to determine K1$_A$.

In step 205, the value K5$_B$, calculated in a manner similar to K5$_A$ for a line-to-neutral reference voltage $V_{BN}^{REF}$, is combined with the value K5$_A$ to produce the value K5$_C$. In steps 206, 208 and 210, 25% of the PWM period is combined with the values K5$_A$, K5$_B$, K5$_C$ and the values K16$_A$, K16$_B$, K16$_C$ to produce output values K17$_A$ K17$_B$, K17$_C$, respectively, corresponding to the modulation adjustments to be applied to the leading and falling edges of the PWM signals supplied to transistors 10–20. Importantly, as the filter F approaches 250% of I$_{LIMIT}$, the limiting steps 200, 201 and 203 progressively limit the values K14$_A$, K14$_B$ and K14$_C$ so that the filter F does not produce filter currents I$_{FA}$, I$_{FB}$ and I$_{FC}$ in excess of 250% of its RMS capacity. In this respect, the value I$_{LIMIT}$ supplied to limiter steps 200, 201 and 203 normally equals the rated RMS current of the filter F. However, if the actual RMS current of the filter F exceeds the rated value, the value of I$_{LIMIT}$ is reduced. This reduction results in the actual RMS current being reduced to the rated value. In this manner, filter F can produce momentary filter currents up to 250% of the rated RMS current to supply momentary peak load current demands while avoiding extended exposure to RMS currents in excess of its capacity.

Figure 5D:
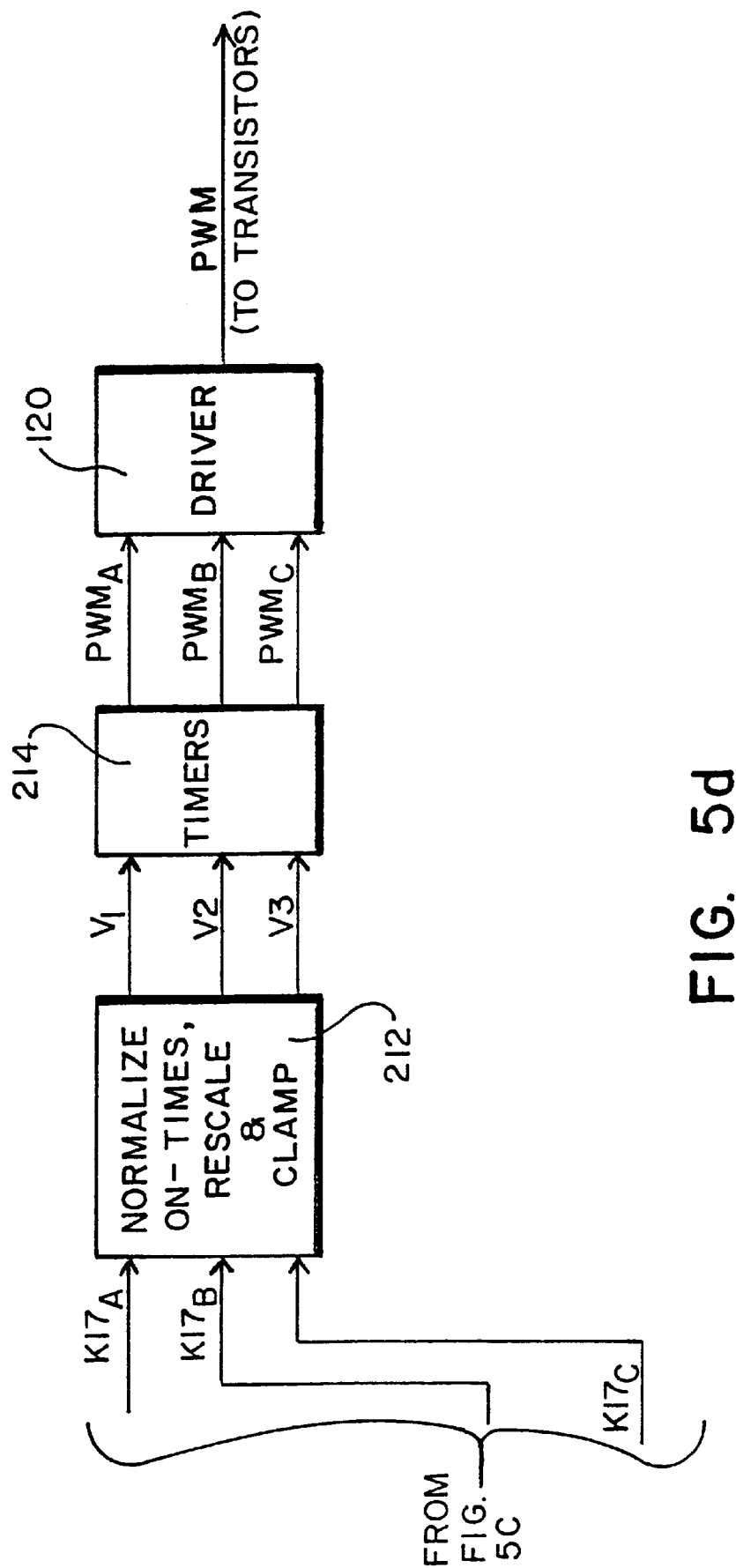

Referring to FIG. 5d, in step 212, each of the values of K17$_A$, K17$_B$ and K17$_C$ are normalized, rescaled and clamped to duty cycle times V$_1$, V$_2$ and V$_3$ which are provided to the timers 214. The timers 214 convert the duty cycle times to PWM firing waveforms PWM$_A$, PWM$_B$, and PWM$_C$. Driver 120 converts the PWM firing waveforms PWM$_A$, PWM$_B$, and PWM$_C$ to the modulated PWM signals provided to the transistors 10–20.

Figure 6A:
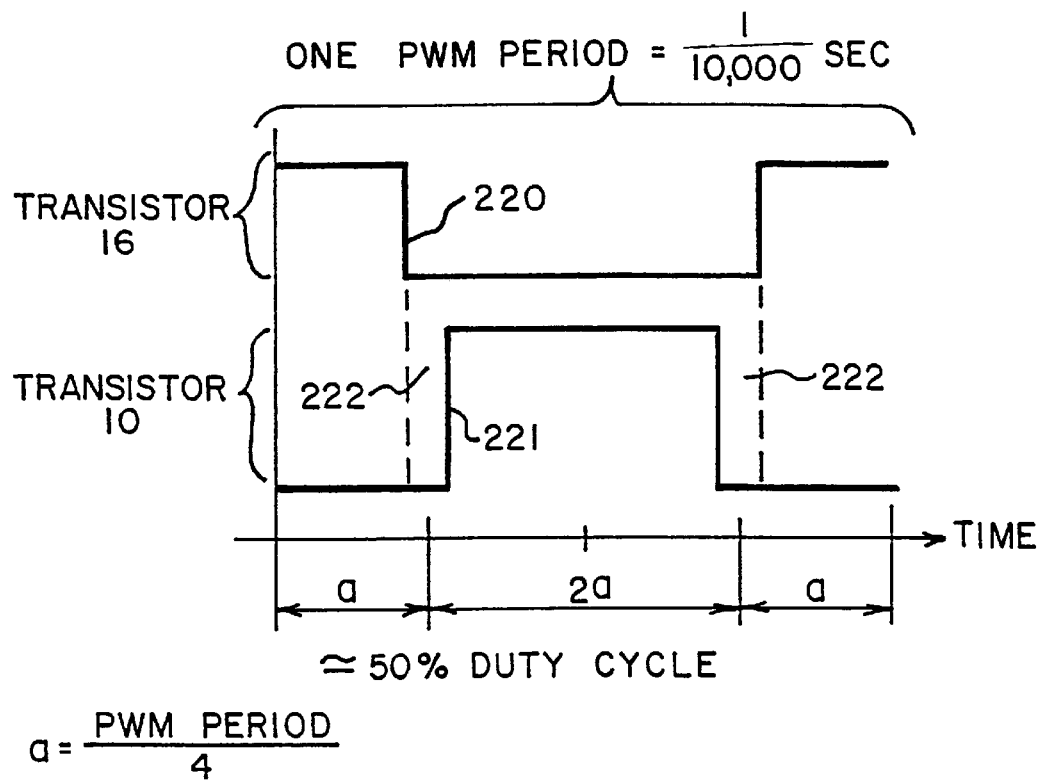
FIGS. 6a–6c show voltage waveforms of the duty cycles of transistors of the filter F of FIG. 1.
Figure 6B:
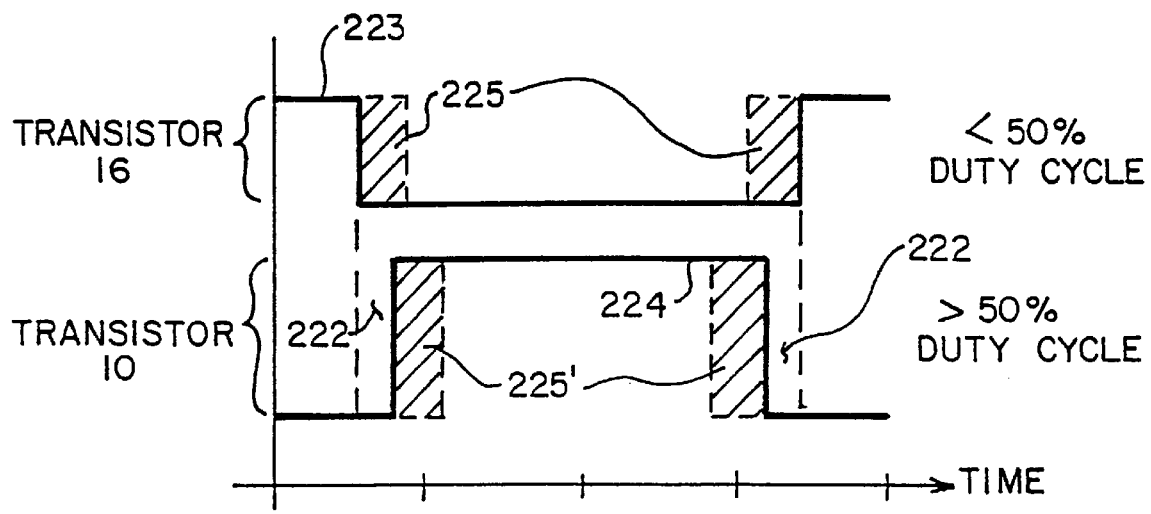
Figure 6C:
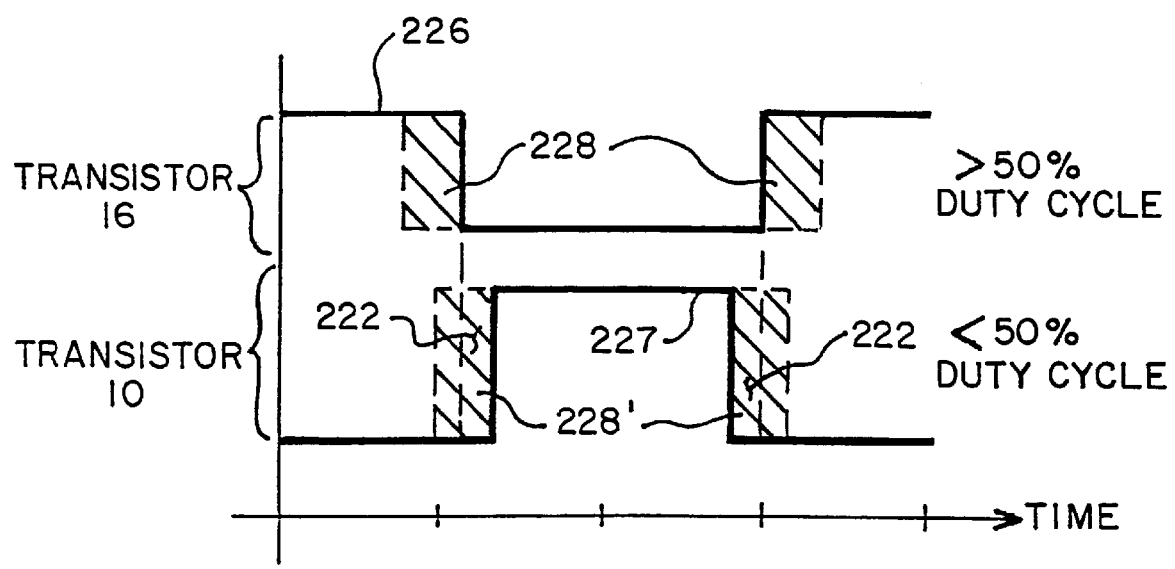

With reference to FIG. 6a, PWM signals 220 and 221 for transistors 16 and 10, respectively, are shown in relation to one PWM interval. The PWM signals 220 and 221 have a 50% duty cycle. To avoid having PWM signals 220 and 221 on simultaneously, a short dead time 222 is provided between the turn-off of transistor 10 and the turn-on of transistor 16 and vice versa. This dead time 222 ensures that opposite terminals of capacitors 32–34 are not shorted. The duty cycles of PWM signals 220 and 221 in FIG. 6a are exaggerated to emphasize the dead time 222. FIG. 6b illustrates PWM signal 224 having greater than a 50% duty cycle and PWM signal 223 having less than a 50% duty cycle. The amount added to each side of the 50% duty cycle waveform of FIG. 6a to obtain the PWM signal 224 is shown as shaded areas 225'. The amount removed from each of the PWM signal 223 is shown as shaded area 225. The added and removed amounts 225' and 225 correspond to a value for K16$_A$ and K5$_A$ in the control algorithm of FIGS. 5a–5d. FIG. 6c illustrates PWM signal 227 having a duty cycle less than 50% and PWM signal 226 having a duty cycle greater than 50%. The amount removed from each side of the 50% duty cycle waveform of FIG. 6a to obtain the PWM signal 227 is shown as shaded areas 228'. The amount added to each side of the 50% duty cycle waveform of 6a to obtain the PWM waveform 226 is shown as shaded areas 228. The added and subtracted amounts 228 and 228' correspond to a different value of K16$_A$ and K5$_A$ calculated by the control algorithm. To affect the control illustrated in FIGS. 6a–6c, the control algorithm illustrated in FIGS. 5a–5d is performed at twice the approximately 10 KHz switching frequency of the inverter I. In this manner, the value of, for example, K16$_A$ and K5$_A$ which corresponds to the shaded areas 225 225', 228 228', can be independently adjusted so that a desired amount can be added or subtracted from each side of the nominal, e.g., 50%, duty cycle.

Figure 7:
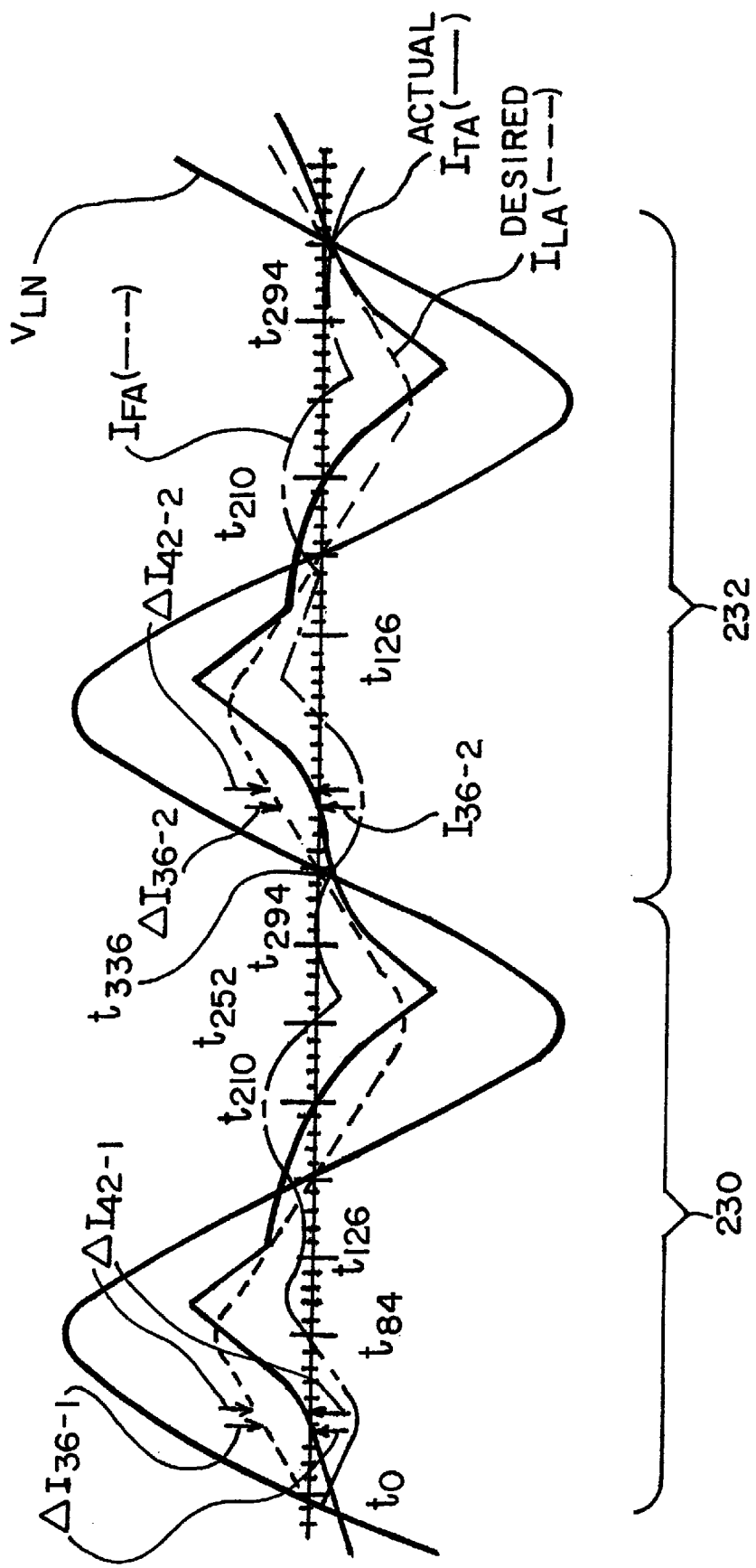
FIG. 7 shows an exemplary line-to-neutral voltage and line current with a desired load current and filter current superimposed thereon.

With reference to FIG. 7, and with continuing reference to FIGS. 5a–5d, for each phase of the 3-phase source, the predictor routine 190 obtains 336 samples of the line-to-neutral voltage $V_{AN}^{REF}$, the line current I$_{LA}$ and the filter current I$_{FN}$ for each cycle of the line voltage. The 336 samples correspond to twice the approximately 10 KHz switching frequency of the inverter I divided by the line frequency of 60 Hz. During a first line cycle 230, the difference between the actual load current $I_T^{ACTUAL}$ and the desired line current $I_L^{DESIRED}$, in phase with the line voltage V$_L$, is determined for each of the 336 samples of the line current I$_{LM}$. The predictor routine 190 determines differences between closely adjacent difference currents ΔI. The difference currents are stored in a memory unit for subsequent retrieval. In the absence of changes in the load between the first cycle 230 and a second cycle 232, the actual load current $I_T^{ACTUAL}$ is substantially the same in equivalent segments of time in the first cycle 230 and the second cycle 232. Hence, with knowledge of the difference currents between the actual load current $I_T^{ACTUAL}$ and the desired line current $I_L^{DESIRED}$ at each of the 336 samples during the first cycle 230, a correction can be determined for each equivalent sample in the second cycle 232. For example, the predictor routine 190 determines between difference currents ΔI$_{36-1}$ and ΔI$_{42-1}$, at times t$_{36}$ and t$_{42}$, respectively, during the first line cycle 230, a difference A$_{3642}$. This difference, A$_{3642}$, is stored in a memory unit. At time t$_{36}$ during the second line cycle 232, the difference A$_{3642}$ is fetched from the memory unit and provided as value K11$_A$ to step 192 of the control routine 184. The sum of delays introduced by the control routine, and the signal propagation and processing delays results in the difference current value ΔI$_{36-2}$ and the current corrections applied by the proportional control routine 178 and the integrating slow control 180 being output as filter current I$_{FA}$ at time t$_{42}$ during the second cycle 232. Hence, the predictor routine can determine in advance the PWM modulation to be provided to transistors 10–20, that when combined with the real time PWM modulation provided by the proportional control routine 178 and the integrating slow control routine 180, produce the filter currents I$_{FA}$, I$_{FB}$, and I$_{FC}$ that reduce the phase shift between the line voltages V$_{AN}$, V$_{BN}$, and V$_{CN}$ and line currents I$_{LA}$, I$_{LB}$ and I$_{LC}$, respectively.

The predictor routine 190 also performs weighted averaging on the difference currents, e.g., 234, detected at equivalent times in different cycles. This weighted averaging more heavily weighs recent difference current samples so that the value of K11$_A$ can be adjusted to account for changes in the load.

Figure 8:
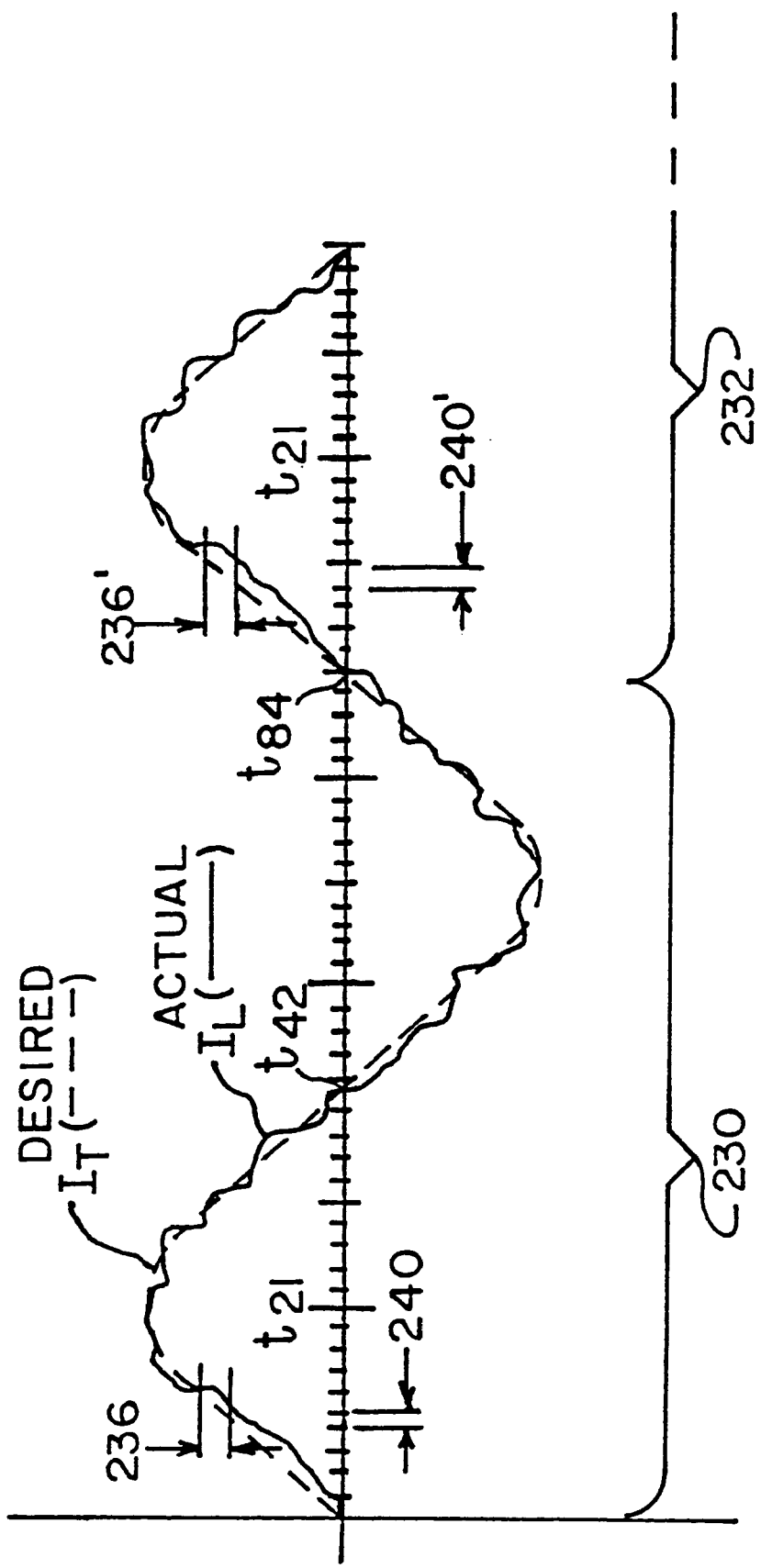
FIG. 8 shows an exemplary desired line current and an exemplary actual line current.

With reference to FIG. 8, the integrating slow control routine 180 integrates the difference between the actual line current $I_L^{ACTUAL}$ and the desired line current, $I_L^{DESIRED}$, i.e., difference currents, in 84 equivalent time segments of different line cycles. For example, the difference current 236 in time segment 240 of the first line cycle 230 is integrated with the difference current 236' of time segment 240' in the second line cycle 232. Integrating the difference currents 236 and 236' in equivalent time segments of different cycles enables the adjustment value $A_{ISC}$ to reduce harmonic distortion of the line current $I_{LA}$. Preferably, the integrating slow control routine 180 integrates the difference currents, e.g., 236 and 236', over several line cycles and makes corrections corresponding to the integrated difference currents.

Figure 9:
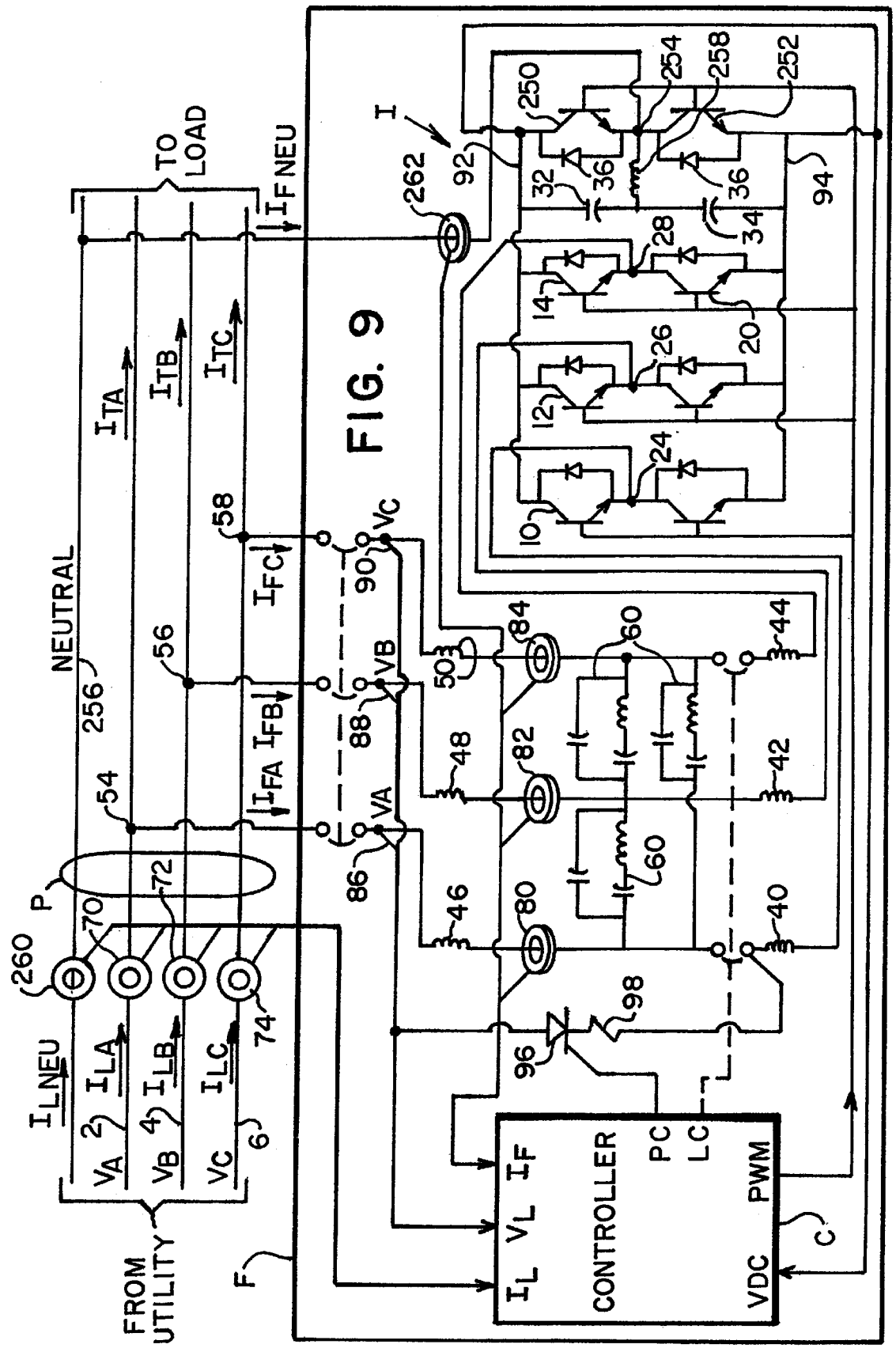
FIG. 9 shows a circuit diagram of an active harmonic filter in accordance with another embodiment of the invention connected to a 3-phase power line P that includes a neutral.

With reference to FIG. 9, in another embodiment, the inverter I includes transistors 250, 252, connected in series. An emitter terminal of transistor 250 is connected to a collector terminal of transistor 252 to form node 254. Connected between the emitter terminal and the collector terminal of each transistor 250, 252 is a diode 36. Each diode 36 has its anode connected to the emitter terminal and its cathode connected to the collector terminal of the corresponding transistors 250, 252. The node 254 is connected to a neutral line 256 of the power line P. Connected between the node 254 and the junction of capacitors 32–34 is an inductor 258. The remaining circuit elements shown in FIG. 9 are arranged in the same manner as like numbered circuit elements in FIG. 1.

Generally, the inverters I in FIGS. 1 and 9 are operated to controllably supply current to or draw current from lines 2, 4 and 6. Moreover, the inverters I are operated to supply current from the lines 2, 4 and 6 to the capacitors 32–34 to maintain the voltage VDC thereacross at or near the desired voltage level. In the embodiment shown in FIG. 9, current flow in the neutral can be controlled by appropriate PWM modulation of transistors 10–20, 250 and 252. Moreover, transistors 250, 252 and inductor 258 can be utilized to balance the voltage VDC across capacitors 32–34. More specifically, if capacitor 32 is charged greater than capacitor 34, turning on transistor 250 causes current to flow between the terminals of capacitor 32 via transistor 250 and inductor 258. At an appropriate time, transistor 250 is turned off and current flowing through inductor 258, caused by the collapsing magnetic field thereof, flows through capacitor 34 and diode 36 of transistor 252. Hence, charge initially stored in capacitor 32 is transferred to capacitor 34. Similarly, transistor 252 can be turned on and off to transfer charge from capacitor 34 to capacitor 32.

Because the predictor 190 and the integrating slow control 180 as shown are preferably implemented in software, the predictor 190 and the integrating slow control 180 can be separately adjusted. Hence, harmonic currents can be corrected absent correcting phase shifts between line voltages and line current and vice versa. Moreover, while the control algorithm of FIGS. 5a–5d is described as being implemented in software, it may be possible to implement one or more features of the control algorithm in hardware.

In the embodiment of FIG. 9, values for $K13_C$ in FIG. 5c are determined utilizing steps similar to those utilized to determine values for $K13_A$. These additional steps produce the firing signals for transistors 250 and 252. Moreover, current sensor 260 is provided for monitoring the line neutral current $I_{LEU}$ and sensor 262 is included for monitoring the filter neutral current $I_{FNEU}$.

The filter F may also be utilized with a power line P having only two lines, e.g., $V_A$ and $V_B$. In this arrangement, only two of the line current sensors and filter current sensors are required. Moreover, the control algorithm of FIGS. 5a–5d is modified by omitting the steps utilized to determine the values of $K13_B$ in FIG. 5c, and omitting the PWM firing signals to two of the series connected transistors, e.g., 14 and 20.

In still another embodiment, the filter F may be utilized with a power line P having only two lines, e.g., $V_A$ and $V_B$, to supply power to a 3-phase load. This embodiment is similar to the embodiment shown in FIG. 1 absent one phase, e.g., $V_C$, and one line current sensor, e.g. 74. Moreover, the control algorithm is modified by omitting the steps to determine values for $K8_B$. However, PWM firing signals to all three pairs of series connected transistors are generated to create the extra phase voltage, e.g. $V_C$. Absent the third line, e.g., 6, the line-to-line voltages and lines currents associated with this phase and are not obtainable directly and therefore must be determined by the controller in software.

In a last embodiment, filter F can be utilized to generate a neutral from three lines of AC power. This embodiment utilizes the four pole inverter of the type illustrated in FIG. 9, three line current sensors and four filter current sensors. In this embodiment the control algorithm generates PWM firing signals utilized to selectively drive all four pairs of the transistors shown in FIG. 9.

Based on the foregoing detailed description, it can be seen that the active harmonic filter of the present invention enables current to be supplied to or drawn from the line at appropriate times to reduce load induced phase shifts between the line voltage and the line current, reduce line current harmonics and improve the balance of currents in the power lines of a polyphase system.

The above invention has been described with reference to the preferred embodiments. Obvious modifications, combinations and alterations will occur to others upon reading the preceding detailed description. It is intended that the invention be construed as including all such modifications and alterations insofar as they come within the scope of the appended claims or the equivalents thereof.

We claim:

1. An active harmonic filter connectable to a power line that provides electric energy from a source to a load, the active harmonic filter comprising:

a controller;

an electric energy storage device which stores electric energy;

an inverter connected between the electric energy storage device and the power line, the inverter controlling current flow between the electric energy storage device and the power line in response to a firing command from the controller;

a line current detector positioned to detect current flowing in the power line and to provide an indication of the detected line current to the controller;

a filter current detector positioned to detect filter current flowing between the electric energy storage device and the power line and to provide an indication of the detected filter current to the controller, the combination of the line current and the filter current forming a load current supplied to the load;

a conductor for conveying power line voltage to the controller; and one or more of:

(i) a predictor which predicts in advance from samples of filter current, line current and line voltage a first adjustment combinable with the firing command to cause the inverter to one of (a) supply filter current to and (b) draw filter current from the power line;

(ii) an integrating slow control which integrates from equivalent times in different cycles of the line voltage differences between actual line current and desired line current and which generates therefrom a second adjustment combinable with the firing command;

(iii) a proportional controller which generates from differences between actual line current and desired line current a third adjustment combinable with the firing command; and (iv) a current balancer which balances currents in two or more lines of the power line as a function of samples of the line current and line voltage.

2. The active harmonic filter as set forth in claim 1, wherein the first adjustment is determined at a time t for combination with the firing command at a time t+Δt.

3. The active harmonic filter as set forth in claim 1, wherein:

for each cycle of the line voltage a plurality of firing commands are supplied to the inverter; and two or more corresponding first, second and third adjustments are combined with each firing command.

4. The active harmonic filter as set forth in claim 1, further including:

an inductor connected between the inverter and the power line;

a trap filter connected between the inductor and the power line and having a resonant frequency approximately equal to a switching frequency of the inverter; and a high pass filter connected between the inductor and the power line and adapted to shunt from the electric power line frequencies above the resonant frequency of the trap filter, wherein:

the inverter includes a pair of series connected transistors, where the emitter of one transistor is connected to the collector of the other transistor;

one end of the inductor is connected between the two transistors; and the electric energy storage means is connected across the transistors.

5. The active harmonic filter as set forth in claim 4, wherein the firing command is directly proportional to line-to-neutral voltage, directly proportional to a cycle of the power line and inversely proportional to the voltage of the electric energy storage means.

6. The active harmonic filter as set forth in claim 1, further including a limiter which adjusts the value of one or more of the first, second and third adjustments to limit to a select value the current produced by the active harmonic filter.

7. The active harmonic filter as set forth in claim 6, wherein:

the power line provides two or more phases of electric power from a polyphase source;

the controller generates a firing command and one or more of the first, second and third adjustments for each phase of the polyphase source; and the active harmonic filter further includes a limit adjust which balances the adjustment applied by the limiter.

8. The active harmonic filter as set forth in claim 7, further including:

a normalizer which normalizes, clamps and rescales the combination firing command and the one or more of the first, second and third adjustments for each phase of the polyphase source.

9. The active harmonic filter as set forth in claim 1, wherein the inverter includes:

two transistors, the emitter of one transistor connected to the collector of the other transistor to form a junction therebetween;

an inductor connected between a neutral of the power line and a junction of two series connected energy storage devices that form the electric energy storage means;

the bases of the transistors are connected to receive the firing command from the controller; and the transistors are controllable to transfer charge between each of the series connected storage devices.

10. A method of reducing on an AC power line at least one of phase shift between line voltage and load current and a harmonic of the load current, the method comprising the steps of:

(a) sampling load current and line voltage at a plurality of sample times during a first cycle of the power line;

(b) determining for each sample of load current and line voltage a desired load current that is in-phase with the line voltage;

(c) determining for each of the plurality of sample times a first difference current between the desired load current and the sampled load current;

(d) determining from closely adjacent pairs of first difference currents a plurality of second difference currents, each second difference current corresponding to the difference between one closely adjacent pair of first difference currents; and (e) combining each second difference current with the actual load current at a time during a second cycle of the power line having a select temporal relation to each pair of first difference currents in the first cycle of the power line corresponding to each said second difference current.

11. The method as set forth in claim 10, further including the steps of:

(f) sampling load current and line voltage at a plurality of sample times during the second cycle of the power line equivalent to the plurality of sample times during the first cycle of the power line;

(g) retrieving at a sample time during the second cycle of the power line a stored second difference current determined at a sample time intermediate the sample time during the second cycle of the power line and equivalent sample time during the first cycle of the power line; and (h) combining the retrieved second difference current with the load current at a time during the second cycle of the power line equivalent to the intermediate sample time.

12. The method as set forth in claim 11, further including the steps of:

determining from each sample of load current and line voltage during the second cycle of the power line a desired load current which is in-phase with the line voltage;

determining for each of the plurality of sample times during the second cycle of the power line a first difference current corresponding to a difference between the desired load current and the sampled load current;

averaging the first difference current in equivalent sample times in the first and second cycles of the power line; and storing the averaged first difference current.

13. The method as set forth in claim 11, further including the steps of:

proportionally controlling each of the plurality of first difference currents obtained during each cycle of the power line; and combining each proportionally controlled first difference current with the load current.

14. The method as set forth in claim 11, further comprising the steps of:

integrating the first difference currents obtained from equivalent times in the first and second cycles of the power line;

generating from each integration a corresponding first integrated difference current; and combining each first integrated difference current with the load current at a sample time during the second power line cycle equivalent to each intermediate sample time.

15. An active harmonic filter connectable to a power line that provides electric energy from a source to a load, the active harmonic filter comprising:

a controller connected to detect line voltage and line current of the power line and to provide a firing signal that varies in response to changes in the line voltage;

an inverter connected between the power line and a source of stored energy and connected to receive the firing signal from the controller;

a first determiner which determines from the line voltage and line current a desired line current that will provide to the load the necessary electrical power required for operation thereof and which is in-phase with the line voltage;

a second determiner which determines differences between the line current and the desired line current; and a predictor for determining from two or more closely adjacent differences between the line current and desired line current during a first power line cycle a first adjustment combinable with the firing signal to cause the inverter to produce a filter current that when combined with the line current reduces one of load induced phase difference between the line voltage and the line current, and a line current harmonic.

16. The active harmonic filter as set forth in claim 15, further comprising a feed-back controller including:

a proportional controller which proportionally controls the differences between the line currents and the desired line currents, and which determines a second adjustment indicative thereof which is combinable with the firing signal; and an integrating slow control which integrates differences between the line current and the desired line current in equivalent time segments of the first and second power line cycles and which determines a third adjustment indicative thereof which is combinable with the signal.

17. The active harmonic filter as set forth in claim 16, further comprising a combiner which combines the signal and at least one of the first, second and third adjustments to cause the inverter to produce the filter current.

18. A method of reducing on an AC power line a harmonic of the line current, the method comprising the steps of:

sampling line current and line voltage at a plurality of equivalent sample times during a first and second cycle of the power line;

determining for each sample of line current and line voltage a desired line current that is in-phase with the line voltage;

determining for each of the plurality of sample times a difference current between the desired line current and the sampled line current; and at least one of:
(i) integrating the difference currents in equivalent times of the first and second cycles of the power line, generating from each integration a corresponding integrated difference current and combining each integrated difference current with the line current; and
(ii) proportionally controlling each of the plurality of difference currents, generating from each of the plurality of proportionally controlled difference currents a corresponding proportionally controlled difference current and combining each proportionally controlled difference current with the line current.

19. A method of balancing line currents of a polyphase AC source, the method comprising the steps of:

determining phase-to-neutral power provided to a load by each phase;

determining from the phase-to-neutral power provided to the load by each phase an average power provided to the load by each phase;

determining from the average power provided to the load by each phase an average RMS line current provided to the load by each phase; and balancing the RMS line currents that are one of (i) sourced to and (ii) drawn from the phases as a function of the average RMS line current provided to the load by each phase.

20. An active harmonic filter configured to be connected to two power lines of a single phase AC source, the filer comprising:

a controller configured to be connected to measure the voltage and the current generated by the single phase AC source; and an inverter including three poles, two of the poles utilized to switch power between the inverter and the two power lines and the third pole utilized to switch power between the inverter and a third power line, wherein the controller controls the firing of the three poles to selectively one of (i) source current to and (ii) draw current from the three power lines.

21. An active harmonic filter configured to produce an M phase AC output from an N phase AC input, where N is less than or equal to M, the active harmonic filter comprising:

a controller configured to measure at least one line voltage and at least one line current of the N phase AC input and to produce as a function of the measured voltage and current M firing signals;

an inverter having M poles configured to receive the M firing signals, with the M poles utilized to switch power between the inverter and the M phase AC output, with N of the M poles utilized to switch power between the N phase AC input and the inverter, wherein the controller controls the M firing signals so that the M poles of the inverter coact to selectively one of (i) source current to and (ii) draw current from at least one phase of the M phase AC output.

* * * * *

UNITED STATES PATENT AND TRADEMARK OFFICE
CERTIFICATE OF CORRECTION

PATENT NO. : 5,977,660
DATED : November 2, 1999
INVENTOR(S) : John N. Mandalakas It is certified that error appears in the above-identified patent and that said Letters Patent is hereby corrected as shown below:

Column 5 Line 44 "currents sensors" should read --current sensors--.

Column 5 Line 46 "current sensor" should read --current sensors--.

Column 5 Line 57 "cycle 5" should read --cycles--.

Column 6 Line 6 "$V_{AC}$" should read --$V_{CA}$--.

Column 6 Line 63 "VL" should read --$V_L$--.

Column 7 Line 58 "$1_{LA}$" should read --$I_{LA}$--.

Column 8 Line 13 "tiine" should read --time--.

Column 8 Line 27 "corrseponding" should read --corresponding--.

Column 8 Line 33 "exists" should read --exist--.

Column 8 Line 60 "$I_L^{ARMS}$" should read --$I_{LA}^{RMS}$--.

Column 10 Line 20 "KHZ" should read --KHz--.

Column 11 Line 37 "are normalized" should read --is normalized--.

Column 12 Line 4 "To affect" should read --To effect--.

Column 12 Line 38 "$\Delta_{3642}$." should read --$\Delta_{36-42}$.--.

Column 12 Line 38 after "This difference," "$\Delta_{3642}$" should read --$\Delta_{36-42}$--.

UNITED STATES PATENT AND TRADEMARK OFFICE
CERTIFICATE OF CORRECTION

PATENT NO. : 5,977,660
DATED : November 2, 1999
INVENTOR(S) : John N. Mandalakas It is certified that error appears in the above-identified patent and that said Letters Patent is hereby corrected as shown below:

Column 12 Line 40 "$\Delta_{3642}$" should read --$\Delta_{36-42}$--.

Column 14 Lines 8-9 "and lines currents" should read --and line currents--.

Column 14 Line 9 after "this phase" delete --and--.

Claim 20, Column 18 Line 32, "filer" should read --filter--.

Claim 21, Column 18 Line 50, after "signals;" insert --and--.

Signed and Sealed this

Twenty-ninth Day of August, 2000

Attest:

Q. TODD DICKINSON

Attesting Officer

Director of Patents and Trademarks